(12) United States Patent
Zhu et al.

(10) Patent No.: US 11,425,355 B2
(45) Date of Patent: Aug. 23, 2022

(54) DEPTH IMAGE OBTAINING METHOD, IMAGE CAPTURE DEVICE, AND TERMINAL

(71) Applicant: Huawei Technologies Co., Ltd., Shenzhen (CN)

(72) Inventors: Liyu Zhu, Nanjing (CN); Yongcai Zhong, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/217,755

(22) Filed: Mar. 30, 2021

(65) Prior Publication Data
US 2021/0218948 A1    Jul. 15, 2021

Related U.S. Application Data

(63) Continuation of application No. PCT/CN2019/090251, filed on Jun. 6, 2019.

(30) Foreign Application Priority Data

Sep. 30, 2018  (CN) .......................... 201811160425.3

(51) Int. Cl.
*H04N 13/25* (2018.01)
*H04N 13/111* (2018.01)
(Continued)

(52) U.S. Cl.
CPC .......... *H04N 13/25* (2018.05); *H04N 5/2256* (2013.01); *H04N 5/2258* (2013.01);
(Continued)

(58) Field of Classification Search
CPC . G06T 2207/10024; G06T 2207/10048; G06T 7/55; H04N 13/111; H04N 13/218;
(Continued)

(56) References Cited

U.S. PATENT DOCUMENTS 9,918,072 B2    3/2018  Kim et al.
2003/0095178 A1*  5/2003  Shibayama .......... H04N 13/239
                                                      348/46
(Continued)

FOREIGN PATENT DOCUMENTS

CN        101459784 A    6/2009
CN        105264331 A    1/2016
(Continued)

OTHER PUBLICATIONS

CN/201811160425.3, Office Action, dated Oct. 12, 2021.

*Primary Examiner* — James T Boylan
(74) *Attorney, Agent, or Firm* — Leydig, Voit & Mayer, Ltd.

(57) ABSTRACT

A method applied to a camera that includes a visible light sensor, a phase sensor, and a processor. The visible light sensor collects a visible light image of a shooting scene. The phase sensor collects a phase image of the shooting scene. The processor obtains depth information based on the phase image, and superimposes the depth information on the visible light image to obtain a depth image. Optionally, the camera may also include an infrared illuminator that may be turned on when a scene illumination is insufficient to increase an accuracy of the depth information.

16 Claims, 9 Drawing Sheets

(51) Int. Cl.
*H04N 5/225* (2006.01)
*H04N 5/235* (2006.01)
*H04N 13/00* (2018.01)

(52) U.S. Cl.
CPC ......... *H04N 5/2352* (2013.01); *H04N 13/111* (2018.05); *H04N 2013/0081* (2013.01)

(58) Field of Classification Search
CPC .... H04N 13/25; H04N 13/254; H04N 13/271; H04N 2013/0081; H04N 5/2226; H04N 5/2256; H04N 5/2258; H04N 5/2351; H04N 5/2352; H04N 5/2354; H04N 5/238; H04N 5/243; H04N 5/332
See application file for complete search history.

(56) References Cited

U.S. PATENT DOCUMENTS

| | | | | |
|---|---|---|---|---|
| 2008/0166022 | A1* | 7/2008 | Hildreth | G06T 7/254 382/107 |
| 2009/0213240 | A1* | 8/2009 | Sim | H04N 13/10 348/222.1 |
| 2012/0075510 | A1* | 3/2012 | Sato | G02B 5/281 348/273 |
| 2015/0334315 | A1* | 11/2015 | Teich | G06T 5/20 348/164 |
| 2015/0356738 | A1 | 12/2015 | Yoon et al. | |
| 2016/0037152 | A1* | 2/2016 | Kim | G06T 7/557 348/47 |
| 2017/0223339 | A1 | 8/2017 | Kondo et al. | |
| 2017/0230638 | A1 | 8/2017 | Wajs et al. | |
| 2018/0100731 | A1* | 4/2018 | Pau | H04N 9/04555 |
| 2019/0007675 | A1* | 1/2019 | Zeng | G06V 10/145 |

FOREIGN PATENT DOCUMENTS

| | | |
|---|---|---|
| CN | 105354819 A | 2/2016 |
| CN | 105809125 A | 7/2016 |
| CN | 105874776 A | 8/2016 |
| CN | 106352847 A | 1/2017 |
| CN | 106611430 A | 5/2017 |
| CN | 107003110 A | 8/2017 |
| CN | 108234984 A | 6/2018 |
| EP | 3343911 A1 | 7/2018 |
| WO | 2017117743 A1 | 7/2017 |

* cited by examiner

Image capture device

DEPTH IMAGE OBTAINING METHOD, IMAGE CAPTURE DEVICE, AND TERMINAL

CROSS-REFERENCE TO RELATED APPLICATIONS

This application is a continuation of International Application No. PCT/CN2019/090251, filed on Jun. 6, 2019, which claims priority to Chinese Patent Application No. 201811160425.3, filed on Sep. 30, 2018. The disclosures of the aforementioned applications are hereby incorporated by reference in their entireties.

TECHNICAL FIELD

This disclosure relates to the field of image processing, and in particular, to a depth image obtaining method, an image capture device, and a terminal.

BACKGROUND

With development of an augmented reality (AR) technology and a virtual reality (VR) technology, a requirement for image depth information is increasingly high. A conventional two-dimensional image can hardly meet current various disclosure demands of an image. For example, in the field of video surveillance, there is an increasing demand for image depth information. The increasing demand is closely related to a current target size, example determining, target tracking and identification, and metadata extraction reliability.

An existing depth information obtaining manner may include the following. A visual difference of a dual-lens camera may be used for determining: after imaging is performed by using two cameras that have a specific distance, depth information corresponding to each pixel is calculated through registration of the pixel. Alternatively, two different sensors may be used to obtain depth information and a visible light image, respectively: A structured light sensor obtains the depth information, and a conventional sensor obtains the visible light image.

In this case, both the depth information and the visible light image need to be obtained by using the separate lenses or components, and the depth information needs to be superimposed on the visible light image through algorithm-based registration. In a low-illumination scene, this registration is prone to cause comparatively large noise in the image. Registration precision between the visible light image and the depth information obtained by the dual-lens camera and the structured light sensor is low. A visible light image obtained after the depth information is superimposed cannot accurately reflect the depth information. Therefore, how to obtain an image including accurate depth information becomes an urgent problem to be resolved.

SUMMARY

This disclosure provides a depth image obtaining method, a terminal, and a storage medium, the method being performed to process depth information to obtain more accurate depth information, and include the more accurate depth information in the depth image.

In view of this, a first aspect of this disclosure provides a depth image obtaining method. Details of the method are as follows.

First, visible light and infrared light in a light in a current shooting scene are separately imaged to obtain a phase image and a visible light image of the current shooting scene. The visible light image is collected by a visible light sensor, and the phase image is collected by a phase sensor. Then, depth information in the phase image is calculated based on the phase image and the depth information is superimposed on the visible light image to obtain a depth image.

In an implementation of this disclosure, the phase image is obtained by the phase sensor by imaging the infrared light in the current shooting scene, and the visible light image is obtained by the visible light sensor by imaging the visible light in the current shooting scene. Even in a low-illumination scene, the phase image is usually clearer than the visible light image. Therefore, in this implementation of this disclosure, depth information is calculated based on the phase image, so that the depth information obtained through calculation is more accurate, and a depth image including the depth information is generated. Even in the low-illumination scene, a depth image including accurate depth information can be obtained.

Optionally, in some possible implementations, the method further includes:

when a gain of the visible light sensor is not greater than a first threshold, and a gain of the phase sensor is not greater than a second threshold, controlling an infrared illuminator to be in an off state; and the obtaining the depth information based on the phase image includes: obtaining the depth information with reference to the phase image and the visible light image. Specifically, if the infrared illuminator is in an on state, the infrared illuminator is turned off. If the infrared illuminator is in the off state, the infrared illuminator continues to be in the off state. Then, the depth information is obtained through calculation with reference to the phase image and the visible light image.

Therefore, when the gain of the visible light sensor is not greater than the first threshold, and the gain of the phase sensor is not greater than the second threshold, it may be understood that current illumination is sufficient, and both the obtained phase image and the obtained visible light image are comparatively clear. In this case, the depth information may be obtained with reference to both the phase image and the visible light image. In this way, the obtained depth information is more accurate.

Optionally, in some possible implementations, the obtaining the depth information with reference to the phase image and the visible light image may include:

segmenting the phase image into N direction sub-images, where the N direction sub-images are images including pixel values in N dimensions in the phase image, and N≥2; segmenting each of the N direction sub-images into m pixel regions based on the visible light image; calculating a coordinate difference between a first pixel region in a first direction sub-image and a second pixel region in a second direction sub-image, where the first direction sub-image and the second direction sub-image are different direction sub-images in the N direction sub-images; the first pixel region is any one of m pixel regions in the first direction sub-image; and the second pixel region is a pixel region, corresponding to the first pixel region, in m pixel regions in the second direction sub-image; and performing calculation based on the coordinate difference to obtain the depth information.

This implementation of this disclosure is a specific implementation of depth information calculation. The depth information may be obtained with reference to both the phase image and the visible light image, so that the obtained depth information is more accurate.

Optionally, in some possible implementations, before the phase image and the visible light image are obtained, the method further includes:

when a gain of the visible light sensor is greater than a first threshold, or a gain of the phase sensor is greater than a second threshold, controlling an infrared illuminator to be in an on state.

In the current photographing scene, when illumination is comparatively low, the gain of the visible light sensor or the gain of the phase sensor may be increased, to compensate for luminance of the visible light image or the phase image. Therefore, when the gain of the visible light sensor is greater than the first threshold, or the gain of the phase sensor is greater than the second threshold, it may be understood that current illumination is comparatively low. In this case, the infrared illuminator may be turned on. In this way, an amount of infrared light is increased, the luminance of the phase image is increased, and the luminance of the visible light image is compensated based on the luminance of the phase image.

Optionally, in some possible implementations, the obtaining the depth information based on the phase image may include:

segmenting the phase image into N direction sub-images, where the N direction sub-images are images including pixel values in N dimensions in the phase image, and N≥2; segmenting each of the N direction sub-images into m pixel regions; calculating a coordinate difference between a first pixel region in a first direction sub-image and a second pixel region in a second direction sub-image, where the first direction sub-image and the second direction sub-image are different direction sub-images in the N direction sub-images; the first pixel region is any one of m pixel regions in the first direction sub-image; and the second pixel region is a pixel region, corresponding to the first pixel region, in m pixel regions in the second direction sub-image; and calculating the depth information based on the coordinate difference.

This implementation of this disclosure is a specific algorithm for obtaining depth information based on a phase image, so that accurate depth information can be calculated based on the phase image.

Optionally, in some possible implementations, the method further includes:

obtaining a first luminance histogram of the phase image and a second luminance histogram of the visible light image, where the first luminance histogram includes luminance distribution information of the phase image, and the second luminance histogram includes luminance distribution information of the visible light image; and adjusting the gain of the phase sensor based on the first luminance histogram, and adjusting the gain of the visible light sensor based on the second luminance histogram.

In this implementation of this disclosure, the luminance histograms of the phase image and the visible light image are separately obtained, and the gains of the phase sensor and the visible light sensor are adjusted based on the luminance histograms. For example, if the luminance of the phase image is excessively low, the gain of the phase sensor may be increased, to increase the luminance of the phase image. If the luminance of the phase image is excessively high, the gain of the phase sensor may be reduced, to reduce the luminance of the phase image. If the luminance of the visible light image is excessively high, the gain of the visible light sensor may be reduced, to reduce the luminance of the visible light image. If the luminance of the visible light image is excessively low, the gain of the visible light sensor may be increased, to increase the luminance of the visible light image.

Optionally, in some possible implementations, the method further includes:

when the luminance of the visible light image is not greater than a third threshold, obtaining luminance information of the phase image; and fusing the luminance information of the phase image with the visible light image to obtain a next-frame visible light image, where luminance of the next-frame visible light image is greater than the luminance of the visible light image.

When an average luminance value of the visible light image, a luminance value of a preset region, a luminance value distributed in a comparatively large area, or the like is not greater than the third threshold, it may be understood as that visible light illumination is excessively low. The luminance information of the phase image and the visible light image may be fused to obtain the next-frame visible light image, to improve the luminance of the next-frame visible light image. The next-frame visible light image is used to obtain a next depth image.

Optionally, in some possible implementations, before the phase image and the visible light image are obtained, the method further includes:

obtaining illumination intensity of a current scene; and when the illumination intensity is greater than a fourth threshold, filtering infrared light in light entering a lens, to obtain filtered light, where the filtered light is used to generate the phase image and the visible light image.

Before the phase image and the visible light image are obtained, the illumination intensity, namely, the illumination, in the current scene is obtained first. If the illumination is greater than the fourth threshold, it may be considered that the current illumination is excessively high, and all or some of the infrared light entering the lens may be filtered. The visible light image and the phase image are generated after the infrared light is filtered, to avoid overexposure caused by excessively high luminance of the visible light image and the phase image.

Optionally, in some possible implementations, the method may alternatively include:

obtaining a first luminance histogram of the phase image, where the first luminance histogram includes luminance distribution information of the phase image; determining the luminance of the phase image based on the first luminance histogram; and when the luminance of the phase image is not greater than a luminance threshold, controlling the infrared illuminator to be in the on state.

In this implementation of this disclosure, if it is determined, based on the first luminance histogram, that the luminance of the phase image is not greater than the luminance threshold, it may be understood that current infrared light illumination is excessively low. The infrared illuminator may be controlled to be in the on state, to increase an amount of the infrared light and increase imaging luminance of the phase sensor.

A second aspect of this disclosure provides an image capture device. The image capture device may include:

an imaging module, configured to obtain a phase image and a visible light image of a shooting scene, where the visible light image is collected by a visible light sensor, and the phase image is collected by a phase sensor;

a depth information obtaining module, configured to obtain depth information based on the phase image; and a depth image obtaining module, configured to superimpose the depth information on the visible light image to obtain a depth image.

In some optional implementations, the image capture device further includes a first control module.

The first control module is further configured to: when a gain of the visible light sensor is not greater than the first threshold, and a gain of the phase sensor is not greater than the second threshold, control an infrared illuminator to be in an off state.

The depth information obtaining module is specifically configured to obtain the depth information with reference to the phase image and the visible light image.

In some optional implementations, the depth information obtaining module is specifically configured to:

segment the phase image into N direction sub-images, where the N direction sub-images are images including pixel values in N dimensions in the phase image, and N≥2;

segment each of the N direction sub-images into m pixel regions based on the visible light image, where m≥1;

calculate a coordinate difference between a first pixel region in a first direction sub-image and a second pixel region in a second direction sub-image, where the first direction sub-image and the second direction sub-image are different direction sub-images in the N direction sub-images; the first pixel region is any one of m pixel regions in the first direction sub-image; and the second pixel region is a pixel region, corresponding to the first pixel region, in m pixel regions in the second direction sub-image; and perform calculation based on the coordinate difference to obtain the depth information.

In some optional implementations, the image capture device further includes:

a second control module, configured to: when a gain of the visible light sensor is greater than a first threshold, or a gain of the phase sensor is greater than a second threshold, control the infrared illuminator to be in an on state.

In some optional implementations, the depth information obtaining module is specifically configured to:

segment the phase image into N direction sub-images, where the N direction sub-images are images including pixel values in N dimensions in the phase image, N≥2, and N is an integer;

segment each of the N direction sub-images into m pixel regions, where m≥1 and m is an integer;

calculate a coordinate difference between a first pixel region in a first direction sub-image and a second pixel region in a second direction sub-image, where the first direction sub-image and the second direction sub-image are different direction sub-images in the N direction sub-images; the first pixel region is any one of m pixel regions in the first direction sub-image; and the second pixel region is a pixel region, corresponding to the first pixel region, in m pixel regions in the second direction sub-image; and calculate the depth information based on the coordinate difference.

In some optional implementations, the image capture device further includes:

a luminance histogram obtaining module, configured to obtain a first luminance histogram of the phase image and a second luminance histogram of the visible light image, where the first luminance histogram includes luminance distribution information of the phase image, and the second luminance histogram includes luminance distribution information of the visible light image; and a gain adjustment module, configured to adjust the gain of the phase sensor based on the first luminance histogram, and adjust the gain of the visible light sensor based on the second luminance histogram.

In some optional implementations, the image capture device further includes:

a luminance obtaining module, configured to: when luminance of the visible light image is not greater than a third threshold, obtain luminance information of the phase image; and a luminance fusion module, configured to fuse the luminance information with the visible light image to obtain a next-frame visible light image, where luminance of the next-frame visible light image is greater than the luminance of the visible light image.

In some optional implementations, the image capture device further includes:

an illumination intensity obtaining unit, configured to: before the phase image and the visible light image are obtained, obtain illumination intensity of a current scene; and an infrared light filtering unit, configured to: when the illumination intensity is greater than a fourth threshold, filter infrared light in light entering a lens, obtain filtered light, where the filtered light is used to generate the phase image and the visible light image.

A third aspect of this disclosure provides an image capture device. The image capture device may include: a lens, a visible light sensor, a phase sensor, a processor, a memory, a bus, and an input/output interface. The lens is configured to obtain light in a current scene. The visible light sensor is configured to collect a visible light image of a shooting scene. The phase sensor is configured to collect a phase image of the shooting scene. The memory is configured to store program code. The processor invokes the program code in the memory to perform the steps in any one of the first aspect or the implementations of the first aspect in this disclosure.

In some optional implementations, the image capture device may further include an infrared illuminator. The infrared illuminator is configured to supplement an amount infrared light entering the image capture device in the current scene when the infrared illuminator in an on state.

In some optional implementations, the image capture device may further include an infrared light filter. The infrared light filter may be implemented by using a filter, or may be implemented by using an IR-CUT component, a component similar to the IR-CUT component, or the like. The infrared light filter is configured to filter all or some infrared light entering the lens.

A fourth aspect of this disclosure provides a terminal device, including:

a lens, a processor, a memory, a bus, and an input/output interface. The lens is configured to obtain an optical image. The memory is configured to store program code. The processor is configured to invoke the program code in the memory to perform the steps in any one of the first aspect or the implementations of the first aspect in this disclosure.

A fifth aspect of this disclosure provides a storage medium. It should be noted that technical solutions of the present disclosure essentially, or a part contributing to the prior art, or all or a part of the technical solutions may be implemented in a form of a software product. The computer software product is stored in a storage medium, to store a computer software instruction used by the foregoing devices. The computer software instruction includes a program designed for executing the first aspect.

The storage medium includes any medium that can store program code, such as a USB flash drive, a removable hard disk, a read-only memory (ROM), a random access memory (RAM), a magnetic disk, or an optical disc.

A sixth aspect of embodiments of this disclosure provides a computer program product including an instruction. When the instruction is run on a computer, the computer is enabled to perform the method according to any one of the first aspect or the optional implementations of the first aspect of this disclosure.

A seventh aspect of this disclosure provides a chip system. The chip system includes a processor, and the processor is configured to support an image capture device in implementing the functions in the first aspect, for example, transmitting or processing data and/or information in the foregoing method.

In a possible design, the chip system further includes a memory. The memory is configured to store a program instruction and data that are necessary in the depth image obtaining method. The chip system may include a chip, or may include a chip and another discrete device.

In an implementation of this disclosure, imaging is performed by a visible light sensor and an added phase sensor, to obtain a visible light image and a phase image. In addition, depth information is calculated based on the phase image, and the depth information is fused with the visible light image, to obtain a depth image that carries the depth information. Even in a low-illumination scene, the phase image is more accurate than the visible light image. Therefore, even in the low-illumination scene, depth information obtained by obtaining a phase image by the phase sensor and performing calculation based on the phase image is more accurate than depth information obtained by using a visible light image.

DESCRIPTION OF EMBODIMENTS

This disclosure provides a depth image obtaining method, a terminal, and a storage medium, the method being performed to process depth information to obtain more accurate depth information, and include the more accurate depth information in the depth image.

Figure 1:
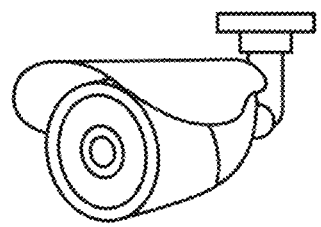
FIG. 1 is a schematic diagram of an disclosure scenario of a depth image obtaining method according to this disclosure.
Figure 1:
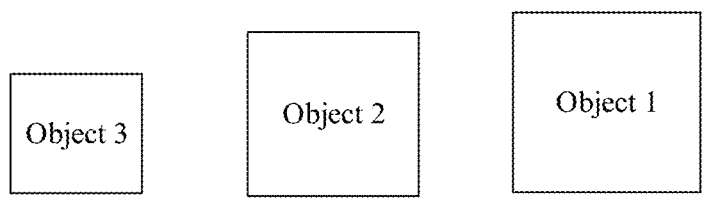

First, the depth image obtaining method provided in this disclosure may be applied to a camera. The camera may be a terminal, a network device, a communications device, or the like; for example, the camera may be a mobile phone, a single-lens reflex camera, a network camera, or a monitoring device, configured to obtain accurate depth information in a current image. A specific disclosure scenario is used as an example, as shown in FIG. 1.

An image capture device may be a monitoring device, a mobile phone, a tablet, a network camera, or the like. The image capture device may be configured to shoot an object, for example, an object 1, an object 2, and an object 3 in FIG. 1. The three objects herein are merely examples for description, and there may be more or fewer objects.

When the image capture device shoots a current scene, a current image may include the object 1, the object 2, and the object 3, and depth information of the three objects relative to the image capture device may be calculated and included in the image of the image capture device.

Figure 2:
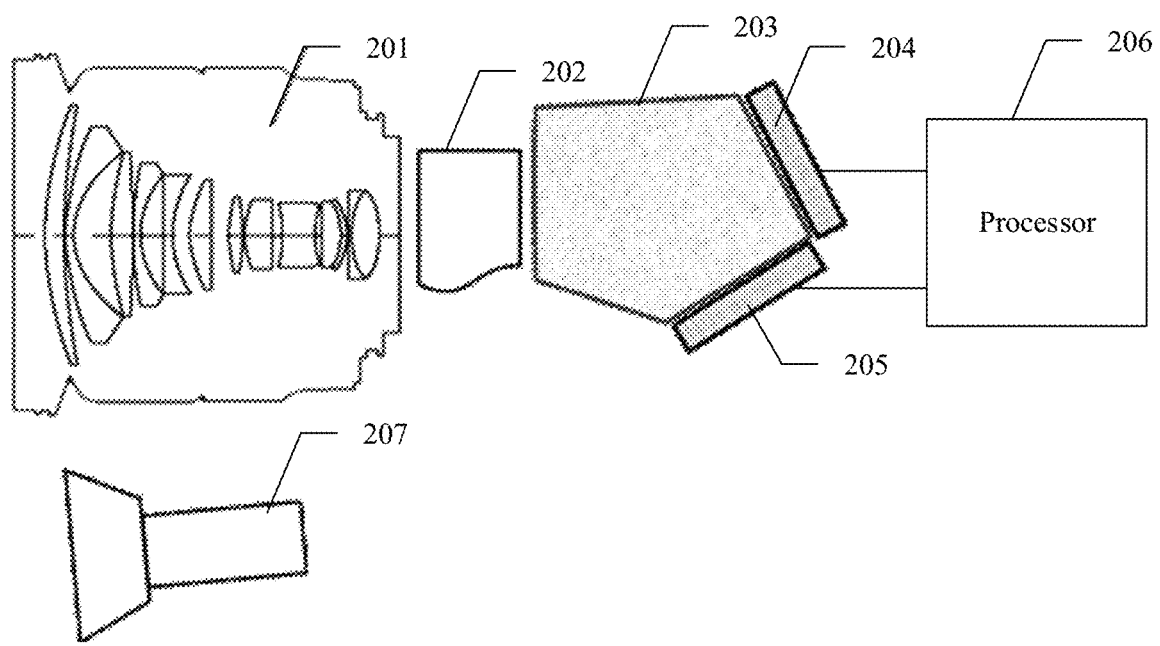
FIG. 2 is a schematic structural diagram of an image capture device according to this disclosure.

Specifically, a specific structure of the image capture device in this disclosure may be shown in FIG. 2, and may include:

an optical lens 201, a variable wave cut-off module 202, a light splitting module 203, a phase sensor 204, a visible light sensor 205, a processor 206, and an infrared illuminator 207.

The optical lens 201 may include a plurality of layers of lenses, and may image light of each spectrum, to implement confocal of visible light and infrared light. There may be one optical lens in an embodiment of the disclosure.

The variable wave cut-off module 202 may admit or shield all or some of the infrared light entering the optical lens 201. In some embodiments, the variable wave cut-off module 202 may be an IR-CUT device or a device similar to an IR-CUT device. It may also be understood that the variable wave cut-off module 202 is a group of filters, and may choose to admit or shield the infrared light based on illumination, to achieve an optimal imaging effect. In an embodiment, the variable wave cut-off module 202 is an infrared light filter.

It should be noted that the variable wave cut-off module 202 may be an optional module in some embodiments.

The light splitting module 203 may split, based on a band, light entering the variable wave cut-off module 202, and split the light to different sensors for imaging. Generally, the light splitting module 203 may be a light splitting prism, a light splitting apparatus similar to the light splitting prism, or the like.

The phase sensor 204 may be a sensor that can convert the infrared light into an electrical signal, and may perform imaging based on infrared light obtained through split by the light splitting module 203, to obtain a phase image.

The visible light sensor 205 may be a sensor that can convert the visible light into an electrical signal, and may perform imaging based on visible light obtained through split by the light splitting module 203, to obtain a visible light image.

The processor 206 is configured to: process the phase image and the visible light image that are obtained by the phase sensor 204 and the visible light sensor 205, control the variable wave cutoff module 202 to admit all or some of the infrared light, and control the infrared illuminator 207 to be turned off or turned on.

Specifically, the processor 206 may include a field programmable gate array (FPGA), or may include a digital signal processing (DSP) module. The processor 206 may further include another device having an image processing function, or the like. This may be adjusted based on an actual disclosure scenario and is not limited herein.

The infrared illuminator 207 may diffuse the infrared light, and supplement infrared light in a current scene. Usually, the infrared illuminator can be turned on when illumination is excessively low.

It should be noted that the infrared illuminator may be located inside the image capture device, or may be located outside the image capture device. When the infrared illuminator is located outside the image capture device, a signal may be sent to the infrared illuminator to control turn-on or turn-off of the infrared illuminator. When the infrared illuminator is located inside the image capture device, the processor may directly control turn-on or turn-off of the infrared illuminator. This may be specifically adjusted based on the actual disclosure scenario and is not limited herein. It should be understood that, in the following description of this disclosure, turn-on or turn-off of the infrared illuminator may be that the processor may directly turn on or turn off the infrared illuminator, or the processor may send a signal to control turn-on or turn-off of the infrared illuminator. This is not further described.

In addition, optionally, the image capture device may further include an image signal processing (ISP) unit. The image signal processing unit is configured to perform image processing, which includes but is not limited to using an image processing algorithm, image optimization parameter configuration, and the like. This is not shown temporarily in the figure.

Figure 3:
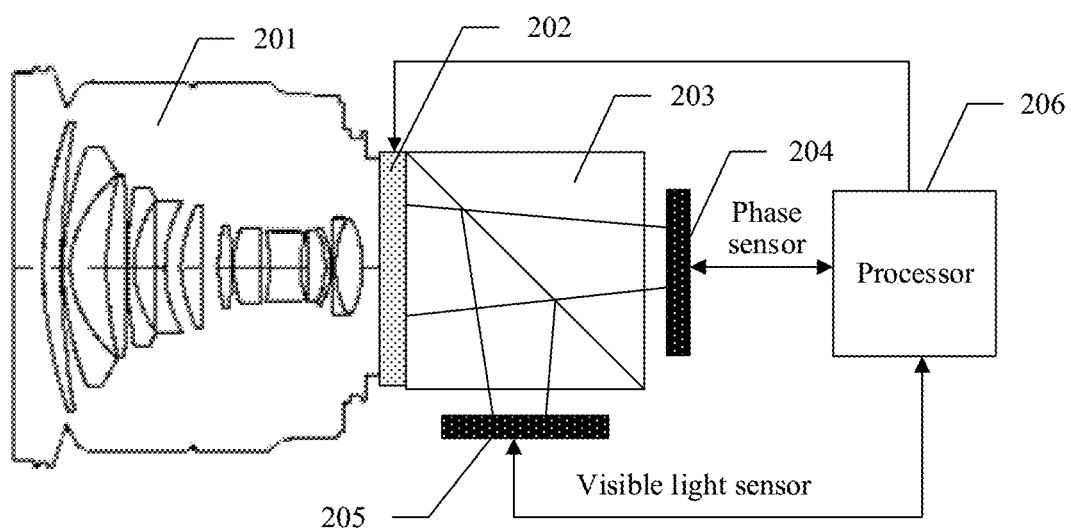
FIG. 3 is another schematic structural diagram of an image capture device according to this disclosure.

A specific imaging scenario of an image capture device may be shown in FIG. 3.

First, an optical lens 201 collects light in a current scene. A light splitting module 203 splits the light, and a visible light image and a phase image are generated on a visible light sensor 205 and a phase sensor 204, respectively. Then, a processor 206 processes the phase image and the visible light image. In addition, the processor 206 may further control the visible light sensor 205, the phase sensor 204, and a variable wave cut-off module 202. The processor 206 controls gains of the visible light sensor 205 and the phase sensor 204, controls the variable wave cut-off module 202 to admit all or some infrared light, and the like.

It should be noted that illumination in this disclosure is short for illumination intensity, and a lens in this disclosure is short for an optical lens.

Figure 4:
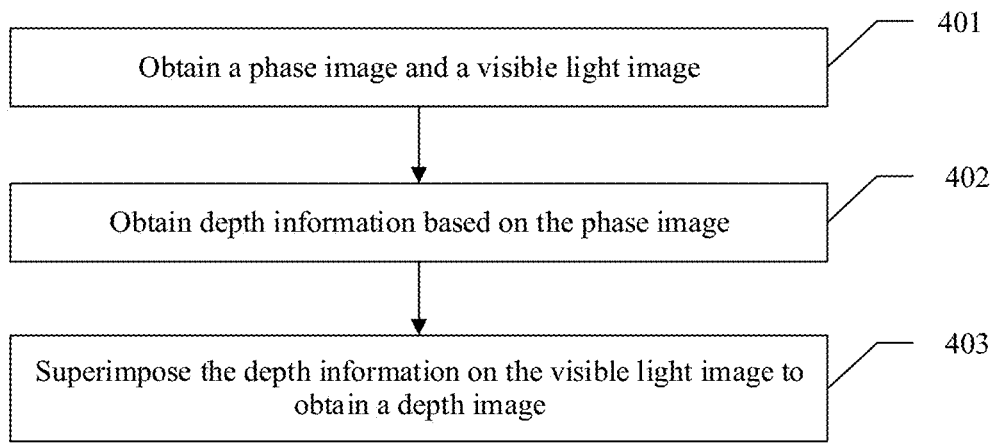
FIG. 4 is a schematic diagram of an embodiment of a depth image obtaining method according to this disclosure.

The depth image obtaining method provided in this disclosure may be performed based on the foregoing image capture device in FIG. 2 and FIG. 3. The following describes the depth image obtaining method provided in this disclosure. FIG. 4 is a schematic diagram of an embodiment of a depth image obtaining method according to this disclosure. The method may include the following steps.

401: Obtain a phase image and a visible light image.

A phase sensor and a visible light sensor are disposed on a light splitting apparatus of the image capture device provided in this disclosure. When shooting a current scene, an optical lens captures light of the current shooting scene, and the visible light sensor may image visible light obtained through split by the light splitting apparatus, so that the visible light entering the visible light sensor is converted into a corresponding electrical signal, to obtain the visible light image. The phase sensor may image infrared light obtained through split by the light splitting apparatus, so that the infrared light entering the phase sensor is converted into a corresponding electrical signal, to obtain the phase image.

The visible light image may be generated based on the visible light obtained through split by the light splitting apparatus, and the phase image may be generated based on the infrared light obtained through split by the light splitting apparatus. In this case, in a comparatively-low illumination scene, image texture, luminance distribution, and the like included in the phase image are more accurate than those included in the visible light image.

402: Obtain depth information based on the phase image.

After the phase sensor obtains the phase image, because the phase image is clearer even in a low-illumination scene, the depth information may be calculated based on the phase image.

The depth information may be a distance between a corresponding object in the phase image and the optical lens. It may be understood that after the phase sensor images the current shooting scene, the phase image includes an object included in the current shooting scene, and the depth information is a distance between the object included in the current shooting scene and the optical lens.

The depth information may be a segment of data, or may be data arranged based on polar coordinates corresponding to the phase image. A manner of calculating the depth information may be segmenting the phase image, and segmenting the phase image into direction sub-images in a preset direction. The preset direction may include a plurality of directions, and "a plurality of" means two or more than two. Then, each direction sub-image is segmented into pixel regions of a preset size, and a coordinate difference in each pixel region in a direction sub-image in a corresponding direction is calculated. For example, a coordinate difference between a left-direction direction sub-image and a right-direction direction sub-image of a target pixel region is calculated. Then, the depth information is calculated with reference to a preset algorithm by using the coordinate difference and a parameter of the optical lens, for example, a focal length and an aperture.

Specifically, the manner of calculating the depth information may be: segmenting the phase image into N direction sub-images in N dimensions, where each dimension is corresponding to one direction sub-image, the N direction sub-images are images formed by pixel values in the N dimensions in the phase image, $N \geq 2$, and N is a positive integer; and segmenting each of the N direction sub-images into m pixel regions, where $m \geq 1$, and m is a positive integer. Each pixel region may include one or more pixels, and a coordinate difference between the pixels in a pixel region corresponding to each direction sub-image is calculated. It may be understood that a pixel region in each of the N direction sub-images has a corresponding pixel region in another direction sub-image other than the direction sub-image of the pixel region. For example, the phase image includes pixel values in three dimensions, and coordinates of one of target pixels are (x, y, z). In this case, after the phase image is segmented into three direction sub-images, values of pixels corresponding to the target pixel in each direction sub-image are separately x, y, and z. A specific manner of calculating a coordinate difference may be: calculating a coordinate difference between a first pixel region in a first direction sub-image and a second pixel region in a second direction sub-image. The first pixel region is any one of m pixel regions in the first direction sub-image. The second pixel region is a pixel region, corresponding to the first pixel region, in m pixel regions in the second direction sub-image. Distances between target pixel regions obtained by mapping the first pixel region and the second pixel region to the phase image and the optical lens are calculated with reference to a preset algorithm by using the coordinate difference and the parameter of the optical lens, for example, a focal length or an aperture, to obtain the depth information.

403: Superimpose the depth information on the visible light image to obtain a depth image.

After visible light information is obtained through calculation based on the phase image, the depth information is superimposed on the visible light image to obtain the depth image including the depth information.

A specific superposition process of the depth information and the visible light image may be as follows: The depth information is a segment of data, and the depth information corresponds to the phase image. In addition, texture in the phase image, a location of an object included in the phase image, and the like correspond to those of the visible light image. Therefore, the depth information may be directly superimposed on the visible light image, and depth values and corresponding coordinates included in the depth information are stored in data of the visible light image to obtain the depth image.

For example, the depth information is information obtained through calculation based on the phase image, the depth information includes a depth value corresponding to each pixel in the phase image, and the depth information may be a matrix including the depth value of the pixel. The visible light image may be understood as a matrix including luminance, a pixel value, and the like of each pixel. The matrix corresponding to the depth information is combined with a matrix corresponding to the visible light image, and the depth value is added to the matrix corresponding to the visible light image. For example, a depth value of one of the target pixels may be represented as (x, y, z, n), where x, y, and z may be understood as coordinates of the target pixel in the phase image, and n is the depth value. A value of a corresponding pixel in the visible light image may be represented as (r, g, b, l), where r, g, and b are coordinates of the target pixel in the visible light image, and l is a luminance value. In this case, (r, g, b, l, n) may be obtained by superimposing the depth value on the visible light image. In other words, the depth value is stored in the matrix corresponding to the visible light image, to obtain the depth image including the depth information.

Therefore, in this implementation of this disclosure, the phase image may be obtained by using the phase sensor, the depth information may be calculated based on the phase image, and the depth information is superimposed on the visible light image to obtain the depth image. Even in a low-illumination scene, because the phase image is obtained by imaging of infrared light, an obtained phase image is clearer than the visible light image. The depth information can be calculated based on the phase image, so that accuracy of the depth information can be improved.

In some optional implementations, in the low-illumination scene, an infrared illuminator may be further used to make the phase image clearer, so that the obtained phase image is more accurate, and the depth information obtained through calculation based on the phase image is more accurate. The following describes a process of using an infrared illuminator. A flowchart of a depth image obtaining method provided in this disclosure may be shown in FIG. 6, and may include the following steps.

601: Obtain an illumination indicator value.

First, an illumination indicator value of an image capture device in a current scene is obtained. The illumination indicator value is a value used to indicate illumination intensity. The illumination indicator value may be a value that can reflect illumination, such as visible light illumination, infrared light illumination, and a gain of each sensor.

Specifically, the illumination indicator value may be collected by using a preset illumination sensor, or may be determined based on a gain of a sensor in the image capture device.

602: Determine whether the illumination indicator value meets a preset condition. If the illumination indicator value meets the preset condition, perform step 606. If the illumination indicator value does not meet the preset condition, perform step 603.

After a current illumination indicator value is obtained, it is determined whether the illumination indicator value meets the preset condition. If the illumination indicator value meets the preset condition, current illumination is sufficient, and step 606 is performed. If the illumination indicator value does not meet the preset condition, the current illumination is excessively low, and step 603 is performed.

Specifically, the preset condition may be whether illumination intensity of current visible light or infrared light meets an illumination threshold, whether a gain of a visible light sensor or a phase sensor exceeds a gain threshold, or the like. If the illumination indicator value does not meet the preset condition, it may be understood that current visible light illumination or current infrared light illumination is excessively low, and step 603 is performed to turn on an infrared illuminator; or if the illumination indicator value does not meet the preset condition, it may be understood that current visible light illumination or current infrared light illumination is normal, and step 606 may be performed.

603: Turn on the infrared illuminator.

If the illumination indicator value does not meet the preset condition, it may be understood that the current illumination is excessively low, and the infrared illuminator may be turned on to supplement the current illumination and increase an amount of light entering the image capture device, so that imaging of the image capture device is more accurate.

In addition, in an implementation of this disclosure, a visible light image and a phase image are obtained by imaging of the visible light sensor and the phase sensor, respectively. The visible light sensor receives visible light obtained through split by a light splitting module (the light splitting module 203 in FIG. 2 and FIG. 3), and performs imaging based on the visible light. In this case, even if the infrared illuminator is turned on, the visible light image is obtained only by imaging of the visible light by the visible light sensor, to avoid color distortion of the visible light image caused by mixing of infrared light and the visible light. In this way, a color of the visible light image is more accurate.

It should be understood that, if a current infrared illuminator is in an on state, the infrared illuminator continues to be in the on state. If the current infrared illuminator is in an off state, the infrared illuminator is directly turned on.

604: Obtain the visible light image and the phase image.

The phase sensor and the visible light sensor are disposed on a light splitting apparatus of the image capture device provided in this disclosure. The visible light sensor may image visible light obtained through split by the light splitting apparatus, so that the visible light entering the visible light sensor is converted into a corresponding electrical signal, to obtain the visible light image. The phase sensor may image infrared light obtained through split by the light splitting apparatus, so that the infrared light entering the phase sensor is converted into a corresponding electrical signal, to obtain the phase image.

605: Calculate depth information based on the phase image.

The current illumination is low, and noise of the visible light image is comparatively large. Therefore, after the infrared illuminator is turned on, the phase image is clearer, and the depth information may be obtained through calculation based on the phase image, so that the obtained depth information is more accurate.

For example, a specific calculation manner of the depth information may be:

dividing the phase image into direction sub-images in four directions (up, down, left, and right) based on a phase pixel of the phase image. A pixel of each direction sub-image is a phase pixel in one direction, and the phase image can be obtained by superimposing the direction sub-images in the four directions.

A direction sub-image is randomly determined in the direction sub-images in the four directions, or a direction sub-image in a preset direction is determined. Through image segmentation, an image may be segmented based on an edge of an object. A specific segmentation manner may be using a super-pixel segmentation manner. First, the image is converted into a grid of a preset size. Then, similar pixels are fused and expanded through continuous iteration, and a grid with a comparatively large pixel value difference is segmented. Finally, an image including a plurality of similar pixel sets is obtained. In addition to the pixel segmentation manner, a segmentation manner based on object identification in the image may also be used. Herein, only the super-pixel manner is used as an example for description, and a specific manner may be adjusted based on an actual scene.

In a segmented image, for each pixel region obtained through segmentation, a pixel region that matches a location is determined in a direction sub-image in a direction other than a current direction. Matching may be performed by using interpolation of a sub-pixel progress. A vertical coordinate difference and a horizontal coordinate difference in each pixel region are calculated based on matching results in direction sub-images of each direction. For example, if coordinates of a word block in a left-direction direction sub-image are (x, y), and coordinates of a corresponding right-direction direction sub-image are (x', y'), a vertical coordinate difference and a horizontal coordinate difference are (x'-x, y'-y).

A depth distance of each pixel region can be calculated with reference to an optical parameter of an optical lens by using the vertical coordinate difference and the horizontal coordinate difference. After the depth distance of each pixel region is calculated, noise is filtered out through interpolation and filtering and a distance parameter is smoothed, to obtain accurate depth information.

Figure 5:
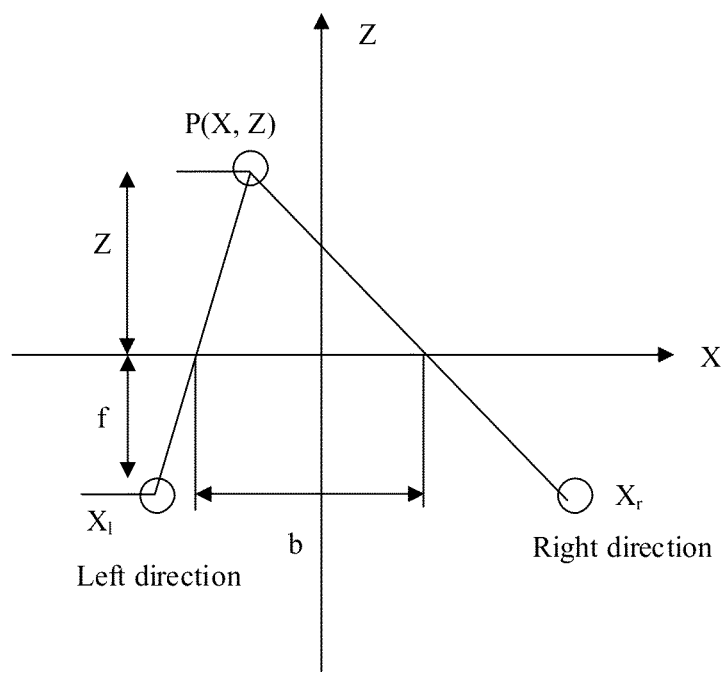
FIG. 5 is a schematic diagram of a depth algorithm of a depth image obtaining method according to this disclosure.

For example, a manner of calculating a depth distance based on a vertical coordinate difference and a horizontal coordinate difference may be as follows: First, a distance difference between pixels in two sub-directions is calculated based on the vertical coordinate difference and the horizontal coordinate difference. The distance difference may be understood as a pixel difference represented by using an image. Pixels of the left-direction sub-image and the right-direction sub-image are used as an example. As shown in FIG. 5, is a focal length of the optical lens. Plane coordinates may be established based on f. $P(X,Z)$ is a target point whose depth distance needs to be calculated. $X_l$ is a pixel, corresponding to a target pixel, of the left direction sub-image. $X_r$ is a pixel, corresponding to the target point, of the right direction sub-image. An intersection point of an axis X and a line between $X_l$ and a point $P(X,Z)$ and an intersection point of the axis X and a line between $X^r$ and the point $P(X,Z)$ are calculated based on the coordinate difference, and a distance between the two intersection points is b. The depth distance may be calculated based on a specific formula: $X_l/f=(X+2b)/Z$ and $X_r/f=(X+2b)/Z$ Therefore, the depth distance may be calculated as $Z=bf/(X_l-X_r)$. It should be understood that the foregoing method based on the plane coordinates is merely an example for description, and may be adjusted based on an actual parameter of the optical lens when the depth information is actually calculated.

In this case, in this embodiment of this disclosure, after it is determined that the current illumination is excessively low, the infrared illuminator may be turned on. After the infrared illuminator is turned on, the current infrared light illumination is supplemented, so that the obtained phase image is more accurate. Therefore, the depth information may be calculated based on the phase image, so that the obtained depth information is more accurate. Even in a low-illumination scene, the accurate depth information may be obtained through calculation.

606: Calculate the depth information based on the phase image and the visible light image.

If the illumination indicator value meets the preset condition, it may be understood that current visible light illumination or current infrared light illumination is normal. In this case, the visible light image and the phase image are normally obtained, and the depth information may be directly calculated based on the phase image and the visible light image that are obtained by imaging of the phase sensor and the visible light sensor.

It should be understood that, if the current visible light illumination or infrared light illumination is normal, the infrared illuminator may not need to be turned on. If the infrared illuminator is in an on state, the infrared illuminator is turned off. If the current infrared illuminator is in an off state, the infrared illuminator may continue to be in the off state.

Specifically, a process of calculating the depth information based on the phase image and the visible light image is similar to the process of calculating the depth information based on the phase image in step 605, and details are not described herein again. A difference lies in that: during image segmentation, because the visible light image can be normally obtained, object distribution in the visible light image may be referenced to segment the direction sub-images more accurately, to obtain a pixel region that better conforms to an object contour. In this way, subsequently obtained depth information can more accurately include each object in the image. For example, when the direction sub-images are segmented, object distribution may be determined based on texture in the visible light image. In addition, the object distribution is mapped to the phase image, and segmentation of the direction sub-images is performed with reference to the object distribution in the visible light image.

Therefore, in this implementation of this disclosure, when the illumination indicator value meets the preset condition, it may be understood that the current illumination is in a normal state, and depth information may be calculated based on the phase image and the visible light image, so that a result of the obtained depth information may be based on both the phase image and the visible light image. Accuracy of the depth information is improved.

607: Fuse the depth information with the visible light image to obtain a depth image.

The depth information is superimposed on the visible light image. The depth information may be obtained through calculation based on the phase image, or may be obtained through calculation with reference to the phase image and the visible light image.

A specific step of superimposing the depth information on the visible light image to obtain a depth image is similar to step 403 in FIG. 4, and details are not described herein again.

Because the depth image includes the depth information, after the depth image is obtained, the depth information related to the depth image may be obtained. For example, accurate distance information may be obtained when a terminal performs distance estimation.

In this implementation of this disclosure, it is first determined whether the illumination indicator value meets the preset condition. If the illumination indicator value meets the preset condition, it may be understood that the current illumination is normal, and the depth information may be calculated based on both the phase image and the visible light image. Therefore, the obtained depth information may be based on both the phase image and the light image, and the obtained depth information is more accurate. If the illumination indicator value does not meet the preset condition, it may be understood that the current illumination is low. In this case, the infrared illuminator may be turned on, to increase an amount of light entering the infrared light of the optical lens, so that the phase image obtained by the phase sensor is more accurate and clearer. Therefore, when illumination is low, depth calculation may be performed based on the phase image. Because the phase image is more accurate after the infrared illuminator is turned on, the depth information obtained through calculation based on the phase image is more accurate. In this case, in this implementation of this disclosure, even under the low illumination, the accurate depth information can be obtained. In addition, the depth information is fused with the depth image, so that the depth information included in the depth image is more accurate. In addition, in this implementation of this disclosure, a fixed-focus lens does not need to be used, and a normal optical lens may be used. The phase sensor and the visible light sensor separately image the visible light image and the phase image, and more accurate depth information is calculated. Therefore, compared with a fixed-focus lens in an existing solution, this implementation of this disclosure is applicable to more disclosure scenarios, and may be used in a general scenario. In addition, compared with the fixed-focus lens or a structured light sensor, in this implementation of this disclosure, accurate imaging at different distances and the depth information calculation can be implemented. This can adapt to a scenario of a larger range.

Figure 7:
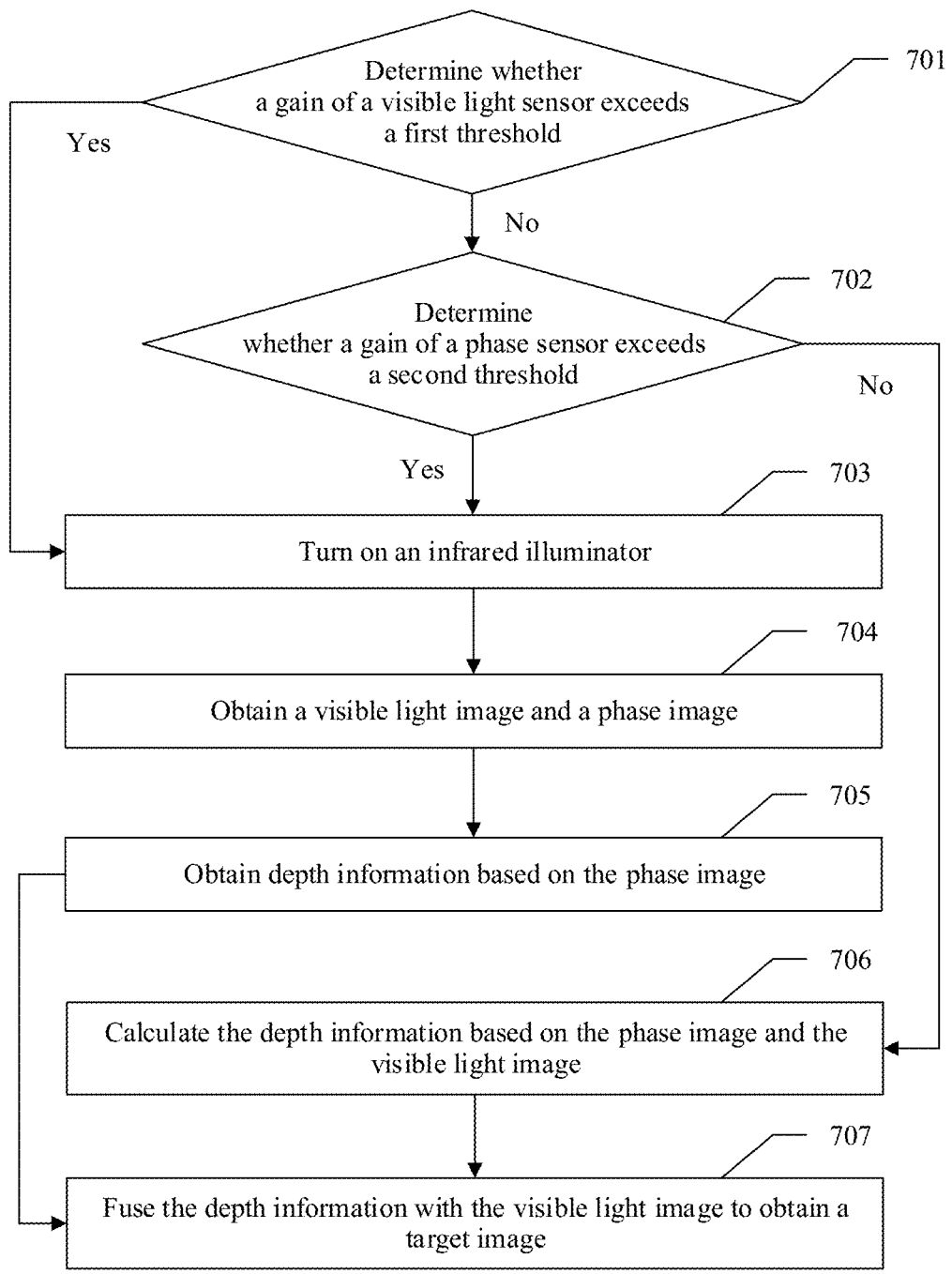
FIG. 7 is a schematic diagram of another embodiment of a depth image obtaining method according to this disclosure.

Still further, in some optional implementations, a manner of determining whether the illumination indicator value meets the preset condition may be: obtaining the gain of the visible light sensor or the gain of the phase sensor, and determining, based on the gain of each sensor, whether the illumination indicator value meets the preset condition. For details, refer to FIG. 7. FIG. 7 is a schematic diagram of another embodiment of a depth image obtaining method according to this disclosure. The depth image obtaining method may include the following steps.

701: Determine whether a gain of a visible light sensor exceeds a first threshold. If the gain of the visible light sensor exceeds the first threshold, perform step 703. If the gain of the visible light sensor does not exceed the first threshold, perform step 702.

The gain of the visible light sensor is related to current illumination, and whether the current illumination is sufficient may be determined based on the gain of the visible light sensor.

The gain of the visible light sensor may usually be stored in a local database or a memory in an image capture device, may be directly read, or may be obtained through calculation based on imaging of the visible light sensor. The image capture device usually adjusts the gain of the visible light sensor, to achieve an optimal imaging effect of the visible light sensor. If the current illumination is excessively low, the gain of the visible light sensor may be increased to make imaging of the visible light sensor clearer. If the current illumination is sufficient, the gain of the visible light sensor may be reduced to avoid overexposure of imaging of the visible light sensor. Therefore, it may be understood that a higher gain of the visible light sensor indicates lower visible light illumination, and a lower gain of the visible light sensor indicates higher visible light illumination. Therefore, when the gain of the visible light sensor exceeds the first threshold, it may be understood that the current illumination is excessively low, and step 703 is performed. If the gain of the visible light sensor does not exceed the first threshold, it may be understood that the current illumination is sufficient, and step 702 is performed.

702: Determine whether a gain of the phase sensor exceeds a second threshold. If the gain of the phase sensor exceeds the second threshold, perform step 703. If the gain of the phase sensor does not exceed the second threshold, perform step 706.

The gain of the phase sensor is also related to the current illumination, and whether the current illumination is sufficient may be determined based on the gain of the phase sensor.

Usually, the gain of the phase sensor may also be stored in the local database or the memory in the image capture device, may be directly read, or may be obtained through calculation based on imaging of the phase sensor. Similarly, it may also be understood that a higher gain of the phase sensor indicates lower current illumination, and a lower gain of the phase sensor indicates higher current illumination.

703: Turn on an infrared illuminator.

Therefore, when the gain of the visible light sensor exceeds the first threshold, or the gain of the phase sensor exceeds the second threshold, it may be understood that the current illumination is comparatively low, and the infrared illuminator may be turned on, to increase the current illumination by using the infrared illuminator and make imaging clearer.

Usually, the infrared illuminator may provide infrared light, and the infrared illuminator is used for light supplement, so that light pollution caused by another over-bright illuminator can be avoided.

704: Obtain a visible light image and a phase image.

Figure 6:
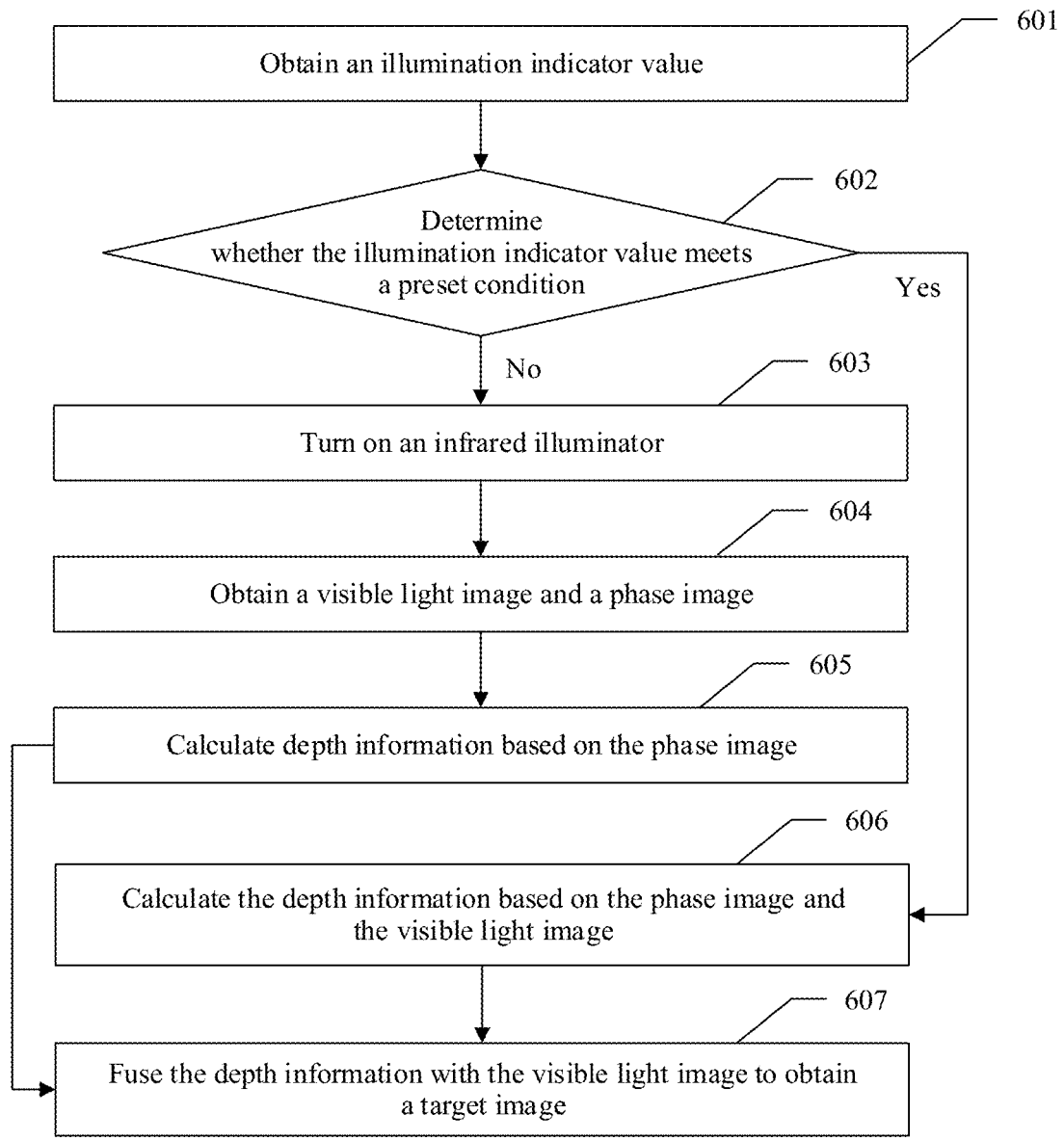
FIG. 6 is a schematic diagram of another embodiment of a depth image obtaining method according to this disclosure.

Step 704 in this disclosure is similar to step 604 in FIG. 6, and details are not described herein again.

705: Obtain depth information based on the phase image.

After the infrared illuminator is turned on, an amount of light entering the infrared light is increased, and the phase image is clearer. In this case, the depth information may be calculated based on the phase image, so that the depth information obtained through calculation is more accurate.

A specific process of calculating the depth information based on the phase image is similar to step 605 in FIG. 6, and details are not described herein again.

706: Calculate the depth information based on the phase image and the visible light image.

If the infrared illuminator is not turned on currently, it may be understood that the current illumination is sufficient, and the obtained phase image and visible light image are clear. In this case, the depth information may be calculated based on the phase image and the visible light image, and the depth information may be calculated with reference to imaging information of the phase image and imaging information of the visible light image. This can avoid inaccuracy of depth information obtained through calculation based on only one image, and improve accuracy of the depth information.

A specific process of calculating the depth information based on the phase image and the visible light image is similar to step 606 in FIG. 6, and details are not described herein again.

707: Fuse the depth information with the visible light image to obtain the depth image.

A specific step of fusing the depth information with the visible light is similar to step 403 in FIG. 4, and details are not described herein again.

The depth image includes the depth information. In this case, a device such as a terminal or a server may accurately learn, based on the depth image, a distance between an object included in the depth image and an optical lens when obtaining the depth image. For example, in unmanned driving of a vehicle, a distance between the vehicle and an obstacle may be accurately determined based on an image including the depth information, to make accurate adjustment and response.

In this case, in this implementation of this disclosure, whether an illumination indicator value meets a preset condition may be determined based on the gain of the visible light sensor or the gain of the phase sensor, and whether the infrared illuminator is turned on is determined depending on whether the illumination indicator value meets the preset condition. If the current illumination is excessively low, the infrared illuminator is turned on, so that the phase image is clearer. In addition, the depth information may be calculated based on the phase image, so that the obtained depth information is more accurate. If the current illumination is sufficient, the infrared illuminator does not need to be turned on, and the depth information is calculated based on the phase image and the visible light image, so that the obtained depth information is more accurate than that obtained through calculation based on only the phase image. In this case, in this implementation of this disclosure, in both a normal-illumination scene and a low-illumination scene, accurate depth information can be obtained through calculation, and a depth image including the accurate depth information can be obtained. In addition, in a process of obtaining the depth image, a fixed-focus optical lens does not need to be used. Compared with an existing solution in which only a fixed-focus lens can be used to calculate the depth information, the depth image obtaining method provided in this disclosure may be applied to more scenes, may be applied to a wider range, and may be used to calculate depth information of an object in a wider range.

Further, in the foregoing implementation corresponding to FIG. 7, after it is determined whether the gain of the visible light sensor exceeds the first threshold, a plurality of scenes may be included. In the following, a scene in which a gain of a visible light sensor does not exceed a first threshold is referred to as a non-low-illumination scene, and a scene in which the gain of the visible light sensor exceeds the first threshold is referred to as a low-illumination scene. Certainly, in addition to distinguishing between the low-illumination scene and the non-low-illumination scene based on the gain of the visible light sensor, an illumination sensor or another photosensor may also be used to distinguish between the low-illumination scene and the non-low-illumination scene. Herein, distinguishing between the low-illumination scene and the non-low-illumination scene based on the gain of the visible light sensor is merely an example for description.

Figure 8:
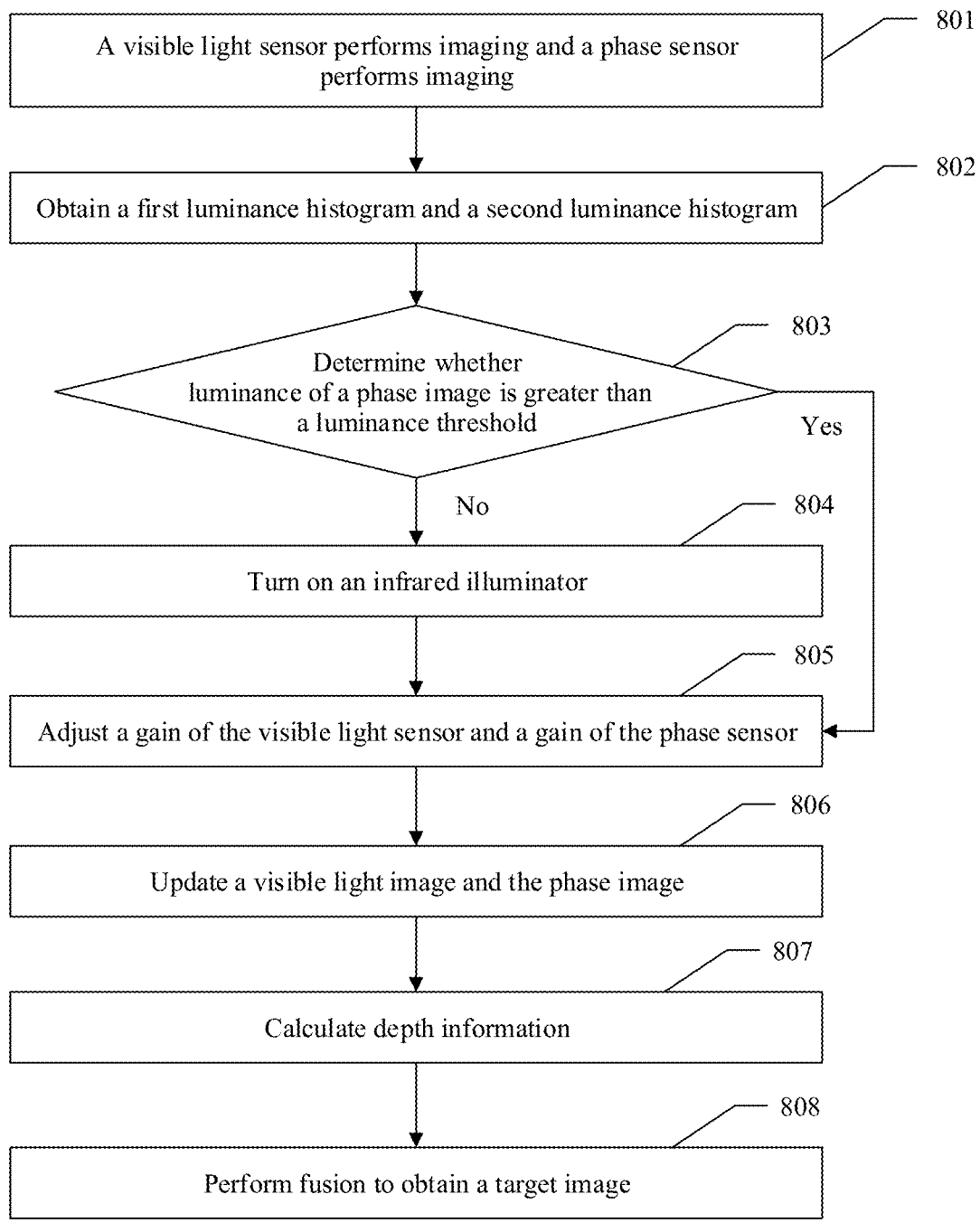
FIG. 8 is a schematic diagram of another embodiment of a depth image obtaining method according to this disclosure.

In some optional implementations, after the low-illumination scene or the non-low-illumination scene is determined, the gain of the sensor may be further adjusted. Adjustment may be performed by determining whether luminance of the phase image is greater than a luminance threshold, or whether luminance of the visible light image is greater than a third threshold. The following separately describes processes of a method for obtaining the depth image in the low-illumination scene and a method for obtaining the depth image in the non-low-illumination scene. First, the process of the depth image obtaining method in the non-low-illumination scene is described. FIG. 8 is a schematic diagram of an embodiment of a depth image obtaining method in a non-low-illumination scene in this disclosure. The depth image obtaining method may include the following steps.

801: A visible light sensor performs imaging and a phase sensor performs imaging.

In the non-low-illumination scene, it may be understood that illumination is sufficient, and imaging is performed by the visible light sensor and the phase sensor. The visible light sensor may obtain a visible light image, and the phase sensor may obtain a phase image.

It may be understood that the visible light sensor may image visible light obtained through split by a light splitting apparatus, and convert the visible light into a corresponding electrical signal, to obtain the visible light image. The phase sensor may image infrared light obtained through split by the light splitting apparatus, and convert the infrared light into an electrical signal, to obtain the phase image.

802: Obtain a first luminance histogram and a second luminance histogram.

Then, luminance extraction may be performed on the visible light image and the phase image to obtain the first luminance histogram corresponding to the phase image and the second luminance histogram corresponding to the visible light image. The first luminance histogram includes luminance distribution information of the phase image, and the second luminance histogram includes luminance distribution information of the visible light image. An image capture device or a terminal may determine luminance distribution of the phase image and the visible light image based on the first luminance histogram and the second luminance histogram.

803: Determine whether luminance of the phase image is greater than a luminance threshold. If the luminance of the phase image is not greater than the luminance threshold, perform step 804. If the luminance of the phase image is greater than the luminance threshold, perform step 805.

It is determined whether the luminance of the phase image is greater than the luminance threshold. If the luminance of the phase image is not greater than the luminance threshold, step 804 is performed. If the luminance of the phase image is greater than the luminance threshold, step 805 is performed.

It should be noted that the luminance of the phase image may be obtained based on the first luminance histogram. In addition, in addition to being obtained based on the first luminance histogram, the luminance of the phase image may be directly extracted from the phase image.

It may be understood that if the luminance of the phase image is not greater than the luminance threshold, current infrared light illumination is low, and step 804 is performed. If the luminance of the phase image is greater than the luminance threshold, the current infrared light illumination is sufficient, and step 805 is performed.

Determining whether the luminance of the phase image is greater than the luminance threshold may be determining whether an average luminance value, a luminance value distributed in a comparatively large area, a luminance value of a specified region, or the like in the phase image is greater than the luminance threshold. This may be specifically adjusted based on an actual disclosure scene, and is not limited herein.

804: Turn on an infrared illuminator.

When the luminance of the phase image is not greater than the luminance threshold, it may be understood that the current infrared light illumination is excessively low. The infrared illuminator may be turned on to increase the infrared light illumination, thereby increasing the luminance of the phase image, making the phase image clearer, and obtaining more accurate phase image.

805: Adjust a gain of the visible light sensor and a gain of the phase sensor.

After the first luminance histogram and the second luminance histogram are obtained, the gain of the phase sensor and the gain of the visible light sensor may be adjusted based on the first luminance histogram and the second luminance histogram, so that the phase image and the visible light image are clearer.

For example, the gain of the visible light sensor may be appropriately increased, and luminance of an over-dark region in the second luminance histogram may be increased. The gain of the phase sensor may also be appropriately reduced, and luminance of an overexposed region in the first luminance histogram may be suppressed, to avoid non-uniform luminance distribution of the visible light image and the phase image, and improve accuracy of the visible light image and the phase image.

It should be noted that a sequence of step 805 and step 803 is not limited in this disclosure. The gain of the visible light sensor and the gain of the phase sensor may be first adjusted, and depth information is calculated after it is determined whether the luminance of the phase image is greater than the luminance threshold. Alternatively, the gain of the visible light sensor and the gain of the phase sensor may be adjusted after it is determined whether the luminance of the phase image is greater than the luminance threshold. That is, step 805 may be performed first, or step 803 may be performed first. This may be specifically adjusted based on the actual disclosure scenario, and is not limited herein.

806: Update the visible light image and the phase image.

After the gain of the visible light sensor and the gain of the phase sensor are adjusted, the phase image and the visible light image are updated.

It may be understood that, after the gain of the visible light sensor and the gain of the phase sensor are adjusted and the infrared illuminator is turned on, an obtained phase image and an obtained visible light image are more accurate. In this case, the visible light image and the phase image that are obtained after the gain of the phase sensor and the gain of the visible light sensor are adjusted may be re-obtained, so that the phase image used for calculating the depth information is more accurate.

It should be understood that the visible light image and the phase image in the foregoing step 801 to step 805 are visible light image and phase image that are before the gain of the visible light sensor or the gain of the phase sensor is adjusted. In this implementation of this disclosure, the visible light image and the phase image in step 806 and the subsequent steps 807 and 808 are visible light image and phase image that are obtained by the visible light sensor and the phase sensor again after the gain of the visible light sensor or the gain of the phase sensor is adjusted.

807: Calculate the depth information.

After the infrared illuminator is turned on, an amount of light entering infrared light is increased, thereby making the phase image more accurate. After the gain of the visible light sensor and the gain of the phase sensor are adjusted, the phase image and the visible light image that are re-obtained after adjustment may also be clearer. Therefore, the depth information may be calculated based on the phase image.

In addition, if the luminance distribution of the visible light image is normal, the depth information may also be calculated with reference to the visible light image. Specifically, the depth information may be adjusted based on the actual disclosure scenario, which is not limited herein.

In another optional implementation, when current visible light illumination or current infrared light illumination is comparatively high, for example, if current illumination intensity is greater than a fourth threshold, a variable wave cut-off module, namely, the variable wave cut-off module 202 in FIG. 2 and FIG. 3, may be adjusted. Only visible light, or visible light and partial infrared light are used to filter infrared light out of light entering an optical lens, to obtain filtered light. The filtered light may be used by a light splitting apparatus for splitting, to obtain the infrared light and the visible light, generate the phase image and the visible light image, and avoid excessively high luminance of the phase image. Therefore, in this implementation of this disclosure, the excessively high luminance of the phase image caused by excessively high illumination can be avoided, and the accuracy of the phase image can be improved. Even in an excessively-high illumination scene, the accurate phase image can be obtained, to obtain more accurate depth information.

Calculating the depth information based on the visible light image and the phase image in step 806 in this disclosure is similar to that in step 606 in FIG. 6, and details are not described herein again.

808: Perform fusion to obtain the depth image.

After the depth information is obtained through calculation, the depth information and the visible light image are fused, and the depth information is added to the visible light image, to obtain the depth image.

Step 807 in this disclosure is similar to step 403 in FIG. 4, and details are not described herein again.

In this case, in this implementation of this disclosure, in the non-low-illumination scene, if the luminance of the phase image is excessively low, the infrared illuminator may be turned on to improve the infrared light illumination, so that the obtained phase image is more accurate. Even if the visible light illumination is normal but the infrared light illumination is low, the accurate depth information can be obtained. The depth information is fused with the depth image to obtain the depth information, so that the depth information included in the depth image is more accurate.

Figure 9:
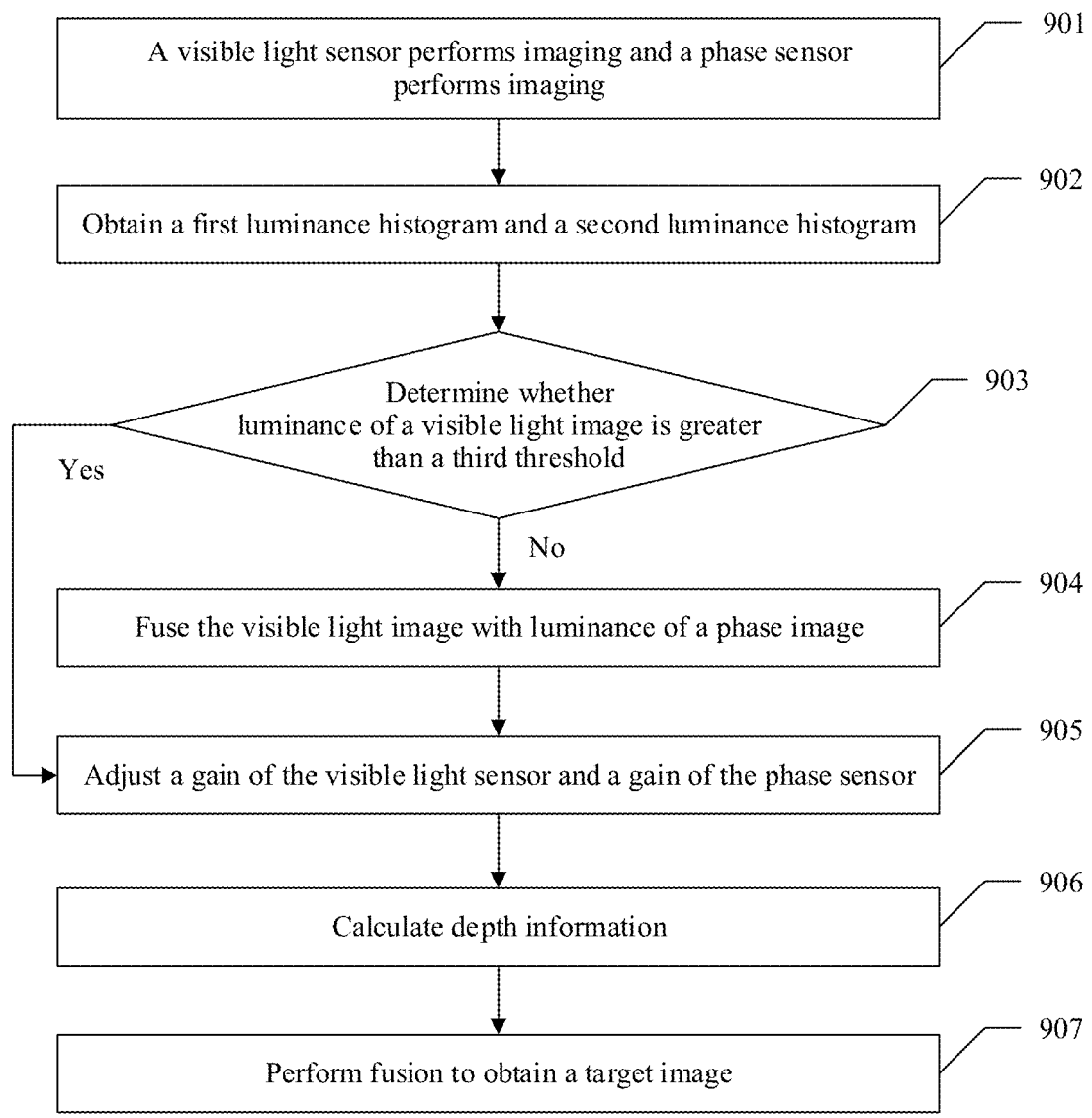
FIG. 9 is a schematic diagram of another embodiment of a depth image obtaining method according to this disclosure.

The following describes a process of obtaining a depth image in a low-illumination scene. FIG. 9 is a schematic diagram of an embodiment of a depth image obtaining method in a low-illumination scene in this disclosure. The depth image obtaining method may include the following steps.

901: A visible light sensor performs imaging and a phase sensor performs imaging.

902: Obtain a first luminance histogram and a second luminance histogram.

Steps 901 and 902 in this embodiment are similar to steps 801 and 802 in FIG. 8, and details are not described herein again.

903: Determine whether luminance of a visible light image is greater than a third threshold. If the luminance of the visible light image is greater than the third threshold, perform step 905. If the luminance of the visible light image is not greater than the third threshold, perform step 904.

After the second luminance histogram of the visible light image is obtained, it is determined whether the luminance of the visible light image is greater than the third threshold. If the luminance of the visible light image is greater than the third threshold, step 905 is performed. If the luminance of the visible light image is not greater than the third threshold, step 904 is performed.

It should be noted that the luminance of the visible light image may be obtained based on the second luminance histogram, or may be directly read.

It may be understood that if the luminance of the visible light image is greater than the third threshold, current visible light illumination is sufficient, and step 905 is performed. It may be understood that if the luminance of the visible light image is not greater than the third threshold, the current visible light illumination is excessively low, and step 904 is performed.

Determining whether the luminance of the visible light image is greater than the third threshold may be determining whether an average luminance value, a luminance value distributed in a comparatively large area, a luminance value of a specified region, or the like in the visible light image is greater than the third threshold. This may be specifically adjusted based on an actual disclosure scenario, and is not limited herein.

904: Fuse the visible light image with luminance of the phase image.

After it is determined that the luminance of the visible light image is not greater than the third threshold, it may be understood that the current visible light illumination is excessively low. Because an infrared illuminator is already turned on, the luminance of the visible light image may be adjusted with reference to the luminance of the phase image. Luminance information of a part or all of regions in the phase image is fused into the visible light image to obtain a next-frame visible light image. The luminance information of the part or all of the regions in the phase image may be obtained based on the first luminance histogram, or may be obtained by directly performing luminance extraction on the phase image. Luminance of a target visible light image is greater than that of a visible light image that is before the luminance information is fused. In this way, the luminance of the visible light image is more accurate, and the obtained visible light image is closer to an actual scene.

Specifically, a specific fusion process may be as follows: A luminance value of the phase image and a luminance value of the visible light image are calculated in proportion to obtain a luminance value of each pixel, and then a luminance value of each pixel in the visible light image is adjusted based on the luminance value of each pixel. For example, if a luminance value of a pixel in the visible light image is 300 nits, and a luminance value of a corresponding pixel in the phase image is 400 nits, a ratio of the luminance value in the visible light image to the luminance value in the phase image may be calculated based on a preset formula. For example, a luminance value of the pixel is calculated 320 nits.

A part in the visible light image corresponding to the phase image is used as an example. The part may be a pixel matrix, for example, a 6×6 pixel matrix. A first luminance component of the part in the visible light image is obtained based on a first weight matrix of a pixel of the part in the visible light image and a corresponding first local image window. The first weight matrix is a weight matrix of a pixel in a local image window of the part in the visible light image. The first weight matrix may be preset, or may be obtained through calculation based on actual luminance value data. A second luminance component of a part corresponding to the phase image is obtained based on a second weight matrix of the part in the phase image and a corresponding image window. The second weight matrix is a weight matrix of a pixel in the local image window of the part in the visible light image. The second weight matrix may be preset, or may be obtained through calculation based on actual data. Then, a proper luminance value s is calculated based on a preset formula, the first luminance component, and the second luminance component. The preset formula may be $\min \|W_i^{1/2}(p_i - Q_i s_i)\|_2^2 + \mu_c \|s_i - s_i^0\|_2^2$, where p is the luminance value of the visible light image, W is a preset fixed matrix, Q is the luminance value of the phase image, and μ is a preset coefficient. These parameters may be adjusted based on an actual requirement, and $s_i$ is a luminance value of a pixel i. After a target luminance value s of each pixel is obtained through calculation, a luminance value of a pixel corresponding to the visible light image is adjusted based on the target luminance value. A transformation matrix x' of the visible light image may be obtained based on s, where x'=x×s, to obtain an adjusted visible light image, namely, the target visible light image.

In addition, in some optional implementations, in addition to fusing the luminance information of the phase image with the visible light image, color inference may be further performed on the phase image to obtain a color inference image of the phase image, and then a color of the visible light image is adjusted based on the color inference image. This avoids color distortion of the visible light image in the low-illumination scene, so that the color of the visible light image is more accurate and richer.

905: Adjust a gain of the visible light sensor and a gain of the phase sensor.

Step 905 in this implementation of this disclosure is similar to step 805 in FIG. 8, and details are not described herein again.

It should be noted that a sequence of step 905 and step 903 is not limited in this disclosure. The gain of the visible light sensor and the gain of the phase sensor may be first adjusted, and depth information is calculated after it is determined whether the luminance of the phase image is greater than the third threshold. Alternatively, the gain of the visible light sensor and the gain of the phase sensor may be adjusted after it is determined whether the luminance of the phase image is greater than a luminance threshold. That is, step 905 may be performed first, or step 903 may be performed first. This may be specifically adjusted based on the actual disclosure scene, and is not limited herein.

After the gain of the visible light sensor and the gain of the phase sensor are adjusted, the visible light image and the phase image may be updated, and a phase image and a visible light image that are obtained after the gain of the visible light sensor and the gain of the phase sensor are adjusted are used to obtain the depth image.

906: Calculate the depth information.

After the gain of the phase sensor and the gain of the visible light sensor are adjusted, because illumination of a current scene is low, the depth information is calculated based on the phase image.

Calculating the depth information based on the phase image in this implementation of this disclosure is similar to that in step 605 in FIG. 6, and details are not described herein again.

907: Perform fusion to obtain the depth image.

After the luminance information of the phase image is fused with the visible light image, the luminance value of the visible light image is increased in the low-illumination scene, so that the visible light image is clearer in the low-illumination scene. Then, the depth information is calculated based on the phase image. The depth information and the visible light image are fused, and the depth information is added to the visible light image, to obtain the depth image. The visible light image is an image to which the luminance information of the phase image is fused.

Step 907 in this disclosure is similar to step 403 in FIG. 4, and details are not described herein again.

It may be understood that after the luminance information of the phase image is fused with the visible light image, the target visible light image in step 904 is obtained, and the depth information is added to the target visible light image, to obtain the depth image.

In this case, in this implementation of this disclosure, in the low-illumination scene, when it is determined, based on the luminance of the visible light image, that the visible light illumination is excessively low, luminance of a part of or all of regions of the phase image may be fused with the visible light image. In this case, even in the low-illumination scene, a luminance enhancement effect may also be implemented on the visible light image, so that the obtained visible light image is more accurate. In addition, the depth information is calculated based on the phase image and the visible light image to obtain more accurate depth information, and the depth image is obtained through fusion. Therefore, if a terminal, a server, another network device, or the like obtains the depth image, depth information corresponding to the depth image may be obtained based on the depth image.

Figure 10:
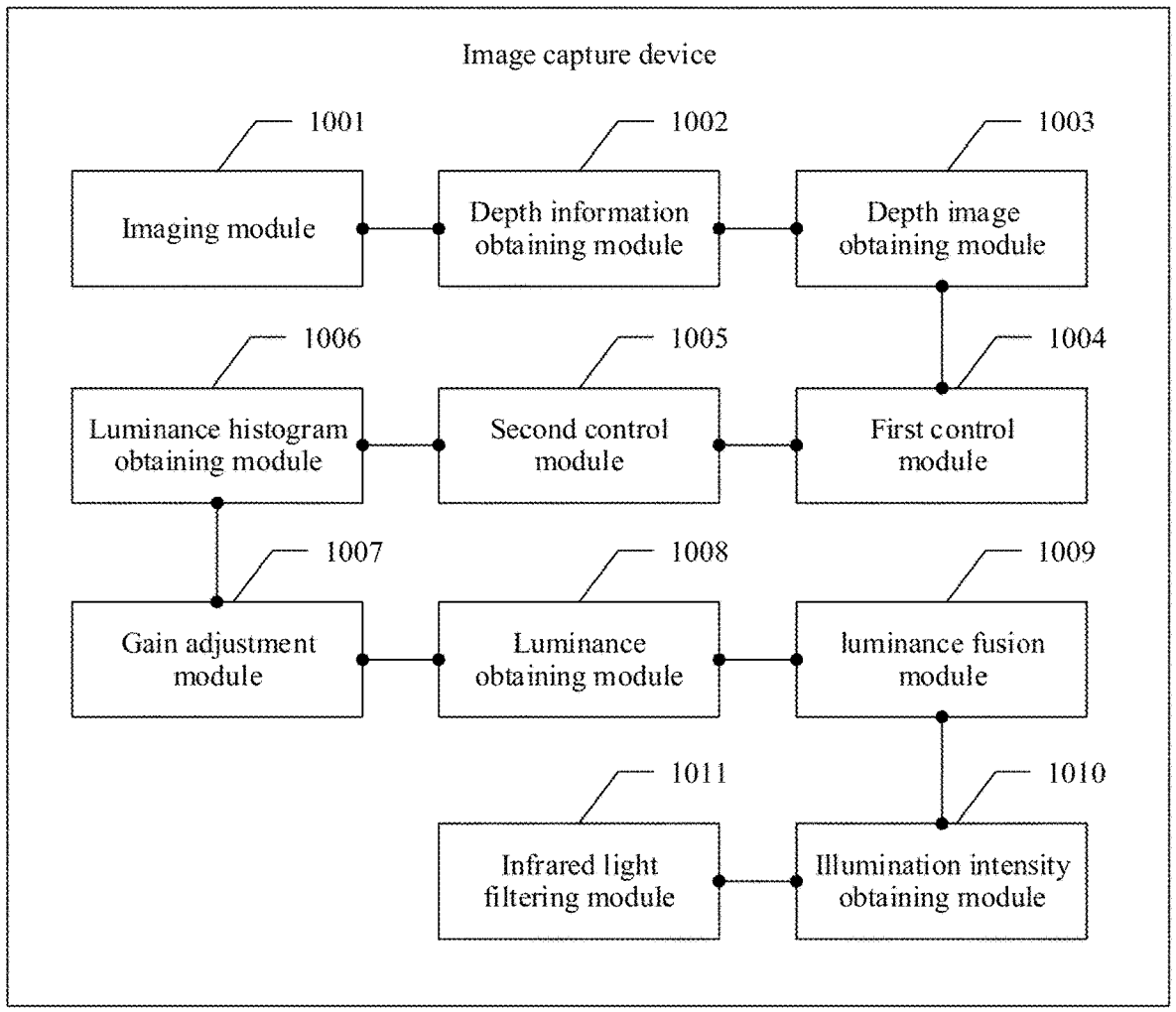
FIG. 10 is another schematic structural diagram of an image capture device according to this disclosure.

The foregoing describes in detail the depth image obtaining method provided in this disclosure. The following describes an apparatus provided in this disclosure. Another schematic structural diagram of an image capture device is shown in FIG. 10, and may include:

an imaging module 1001, configured to obtain a phase image and a visible light image of a shooting scene, where the visible light image is collected by a visible light sensor, and the phase image is collected by a phase sensor;

a depth information obtaining module 1002, configured to obtain depth information based on the phase image; and a depth image obtaining module 1003, configured to superimpose the depth information on the visible light image to obtain a depth image.

Optionally, in some possible implementations, the image capture device further includes a first control module 1004.

The first control module 1004 is further configured to: when a gain of the visible light sensor is not greater than the first threshold, and a gain of the phase sensor is not greater than the second threshold, control an infrared illuminator to be in an off state.

The depth information obtaining module is specifically configured to obtain the depth information with reference to the phase image and the visible light image.

Optionally, in some possible implementations, the depth information obtaining module 1002 is specifically configured to:

segment the phase image into N direction sub-images, where the N direction sub-images are images including pixel values in N dimensions of the phase image, and N≥2;

segment each of the N direction sub-images into m pixel regions based on the visible light image;

calculate a coordinate difference between a first pixel region in a first direction sub-image and a second pixel region in a second direction sub-image, where the first direction sub-image and the second direction sub-image are different direction sub-images in the N direction sub-images; the first pixel region is any one of m pixel regions in the first direction sub-image; and the second pixel region is a pixel region, corresponding to the first pixel region, in m pixel regions in the second direction sub-image; and perform calculation based on the coordinate difference to obtain the depth information.

Optionally, in some possible implementations, the image capture device further includes:

a second control module 1005, configured to: when a gain of the visible light sensor is greater than a first threshold, or a gain of the phase sensor is greater than a second threshold, control the infrared illuminator to be in an on state.

Optionally, in an optional implementation, the depth information obtaining module 1002 is specifically configured to:

segment the phase image into N direction sub-images, where the N direction sub-images are images including pixel values in N dimensions of the phase image, and N≥2;

segment each of the N direction sub-images into m pixel regions;

calculate a coordinate difference between a first pixel region in a first direction sub-image and a second pixel region in a second direction sub-image, where the first direction sub-image and the second direction sub-image are different direction sub-images in the N direction sub-images; the first pixel region is any one of m pixel regions in the first direction sub-image; and the second pixel region is a pixel region, corresponding to the first pixel region, in m pixel regions in the second direction sub-image; and calculate the depth information based on the coordinate difference.

Optionally, in some possible implementations, the image capture device further includes:

a luminance histogram obtaining module 1006, configured to obtain a first luminance histogram of the phase image and a second luminance histogram of the visible light image, where the first luminance histogram includes luminance distribution information of the phase image, and the second luminance histogram includes luminance distribution information of the visible light image; and a gain adjustment module 1007, configured to adjust the gain of the phase sensor based on the first luminance histogram, and adjust the gain of the visible light sensor based on the second luminance histogram.

Optionally, in some possible implementations, the image capture device further includes:

a luminance obtaining module 1008, configured to: when luminance of the visible light image is not greater than a third threshold, obtain luminance information of the phase image; and a luminance fusion module 1009, configured to fuse the luminance information obtained by the luminance obtaining module 1008 with the visible light image to obtain a next-frame visible light image, where luminance of the next-frame visible light image is greater than the luminance of the visible light image.

Optionally, in some possible implementations, the image capture device further includes:

an illumination intensity obtaining unit 1010, configured to: before the phase image and the visible light image are obtained, obtain illumination intensity of a current scene; and an infrared light filtering unit 1011, configured to: when the illumination intensity obtained by the illumination intensity obtaining unit 1010 is greater than a fourth threshold, filter infrared light in light entering a lens, to obtain filtered light, where the filtered light is used to generate the phase image and the visible light image.

In another possible design, when the image capture device is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit, so that the chip in the terminal performs the steps of the methods in FIG. 4 to FIG. 9. Optionally, the storage unit is a storage unit in the chip, for example, a register or a buffer, or the storage unit may be a storage unit in the terminal but outside the chip, for example, a read-only memory (ROM), another type of static storage device that can store static information and an instruction, or a random access memory (RAM).

The processor mentioned above may be a general-purpose central processing unit (CPU), a microprocessor, an application-specific integrated circuit (ASIC), or one or more integrated circuits configured to control program execution of the foregoing depth image obtaining method.

Figure 11:
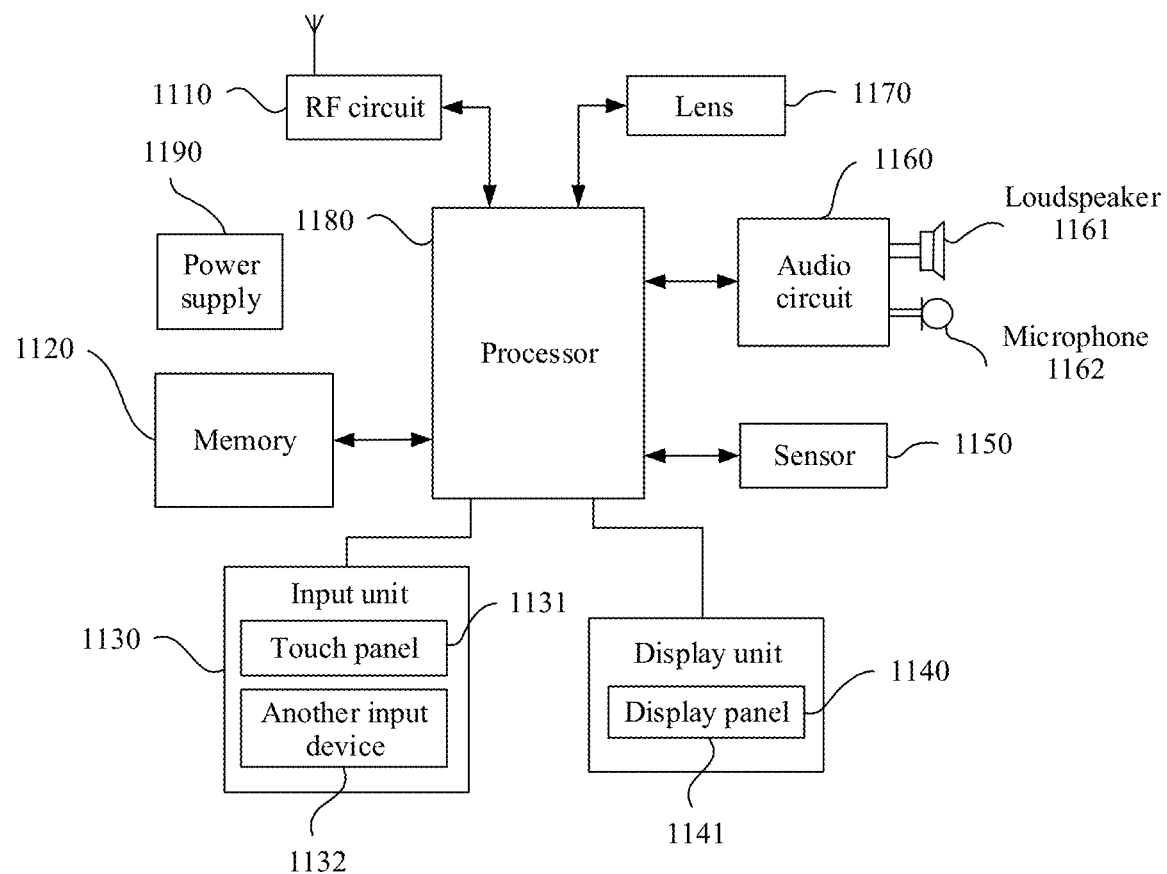
FIG. 11 is another schematic structural diagram of an image capture device according to this disclosure.

An embodiment of the present disclosure further provides another image capture device, as shown in FIG. 11. For ease of description, only a part related to this embodiment of the present disclosure is illustrated. For specific technical details that are not disclosed, refer to the method part of the embodiments of the present disclosure. The image capture device may be any terminal device, including a mobile phone, a tablet, a PDA (personal digital assistant), a POS (point of sales), a vehicle-mounted computer, or the like.

FIG. 11 is a block diagram of a partial structure of the image capture device according to this embodiment of the present disclosure. Referring to FIG. 11, the image capture device includes components such as a radio frequency (RF) circuit 1110, a memory 1120, an input unit 1130, a display unit 1140, a sensor 1150, an audio circuit 1160, a lens 1170, a processor 1180, and a power supply 1190. A person skilled in the art may understand that a structure of the image capture device shown in FIG. 11 does not constitute a limitation on the image capture device, and the image capture device may include more or fewer components than those shown in the figure, combine some components, or may have different component arrangements.

The following describes each constituent part of the image capture device in detail with reference to FIG. 11.

The RF circuit 1110 may be configured to send and receive a signal in an information sending and receiving process or a call process. Particularly, the RF circuit 1110 receives downlink information from a base station, and then delivers the downlink information to the processor 1180 for processing. In addition, the RF circuit 1110 sends related uplink data to the base station. Usually, the RF circuit 1110 includes but is not limited to an antenna, at least one amplifier, a transceiver, a coupler, a low noise amplifier (LNA), a duplexer, and the like. In addition, the RF circuit 1110 may further communicate with a network and another device through wireless communication. Any communications standard or protocol may be used for wireless communication, including but not limited to a global system for mobile communications (GSM), a general packet radio service (GPRS), code division multiple access (CDMA), wideband code division multiple access (WCDMA), long term evolution (LTE), an e-mail, a short message service (SMS), and the like.

The memory 1120 may be configured to store a software program and a module. The processor 1180 executes various function disclosures of the image capture device and process data, by running the software program and the module that are stored in the memory 1120. The memory 1120 may mainly include a program storage region and a data storage region. The program storage region may store an operating system, an disclosure program required by at least one function (for example, a sound play function or an image play function), and the like. The data storage region may store data (for example, audio data and an address book) created based on use of the image capture device, and the like. In addition, the memory 1120 may include a high-speed random access memory, and may further include a nonvolatile memory, for example, at least one magnetic disk storage device, a flash memory device, or another volatile solid-state storage device.

The input unit 1130 may be configured to: receive digit or character information that is input, and generate key signal input related to user settings and function control of the image capture device. Specifically, the input unit 1130 may include a touch panel 1131 and another input device 1132. The touch panel 1131, which is also referred to as a touchscreen, may collect a touch operation (for example, an operation performed by a user on or near the touch panel 1131 by using a finger or any suitable object or accessory such as a stylus) performed by the user on or near the touch panel 1131, and may drive a corresponding connection apparatus based on a preset program. Optionally, the touch panel 1131 may include two parts: a touch detection apparatus and a touch controller. The touch detection apparatus detects a touch direction of the user, detects a signal brought by the touch operation, and transfers the signal to the touch controller. The touch controller receives touch information from the touch detection apparatus, converts the touch information into contact coordinates, then sends the contact coordinates to the processor 1180, and can receive and execute a command sent by the processor 1180. In addition, the touch panel 1131 may be implemented in a plurality of types, such as a resistive type, a capacitive type, an infrared type, and a surface acoustic wave type. The input unit 1130 may further include the another input device 1132 in addition to the touch panel 1131. Specifically, the another input device 1132 may include but is not limited to one or more of physical keyboards, a function key (for example, a volume control key or a power on/off key), a trackball, a mouse, a joystick, and the like.

The display unit 1140 may be configured to display information input by the user or information provided for the user, and various menus of the image capture device. The display unit 1140 may include a display panel 1141. Optionally, the display panel 1141 may be configured in a form of a liquid crystal display (LCD), an organic light-emitting diode (OLED), or the like. Further, the touch panel 1131 may cover the display panel 1141. After the touch panel 1131 detects a touch operation on or near the touch panel 1131, the touch operation is transferred to the processor 1180 to determine a type of the touch event. Then, the processor 1180 provides a corresponding visual output on the display panel 1141 based on the type of the touch event. In FIG. 11, the touch panel 1131 and the display panel 1141 are used as two independent components to implement an input function and an output function of the image capture device. However, in some embodiments, the touch panel 1131 and the display panel 1141 may be integrated to implement the input function and the output function of the image capture device.

The image capture device may further include at least one sensor 1150, such as a light sensor, a motion sensor, and another sensor. Specifically, the optical sensor may include an ambient light sensor and a proximity sensor. The ambient light sensor may adjust luminance of the display panel 1141 based on brightness of ambient light. The proximity sensor may turn off the display panel 1141 and/or be backlight when the image device is moved to an ear. As a type of the motion sensor, an accelerometer sensor may detect values of acceleration in all directions (usually, three axes), and may detect a value and a direction of gravity when the image capture device is in a static state. The accelerometer sensor may be applied to an disclosure identifying a posture of the image capture device (such as screen switching between a landscape mode and a portrait mode, a related game, and magnetometer posture calibration), a function related to vibration identification (such as a pedometer or a knock), or the like. Other sensor such as a gyroscope, a barometer, a hygrometer, a thermometer, and an infrared sensor may be further configured in the image capture device. Details are not described herein again.

The audio circuit 1160, a loudspeaker 1161, and a microphone 1162 may provide an audio interface between the user and the image capture device. The audio circuit 1160 may convert received audio data into an electrical signal, and then transmit the electrical signal to the speaker 1161, and the speaker 1161 converts the electrical signal into a sound signal for output. In addition, the microphone 1162 converts a collected sound signal into an electrical signal. The audio circuit 1160 receives the electrical signal, converts the electrical signal into audio data, and then outputs the audio data to the processor 1180 for processing. After the processing, the processor 1180 sends processed audio data to, for example, another image capture device by using the RF circuit 1110, or outputs the audio data to the memory 1120 for further processing.

The lens 1170 in the image capture device may obtain an optical image. The lens 1170 may specifically further include a phase sensor (which is not shown in the figure) and a visible light sensor (which is not shown in the figure). The optical image may include a phase image and/or a visible light image. There may be one lens in the image capture device, or there may be at least two lenses (which is not shown in the figure), which may be specifically adjusted based on an actual design requirement.

The processor 1180 is a control center of the image capture device, is connected to all components of the entire image capture device by using various interfaces and lines. The processor 1180 implements various functions of the image capture device and processes data, by running or executing the software program and/or the module that are/is stored in the memory 1120 and invoking data stored in the memory 1120. In this case, overall monitoring is performed on the image capture device. Optionally, the processor 1180 may include one or more processing units. Preferably, an application processor and a modem processor may be integrated into the processor 1180. The application processor mainly processes an operating system, a user interface, an application program, and the like. The modem processor mainly processes the wireless communication. It may be understood that the modem processor may alternatively not be integrated into the processor 1180.

The image capture device further includes the power supply 1190 (such as a battery) that provides power for all the components. Preferably, the power supply may be logically connected to the processor 1180 by using a power management system, to implement functions such as charging and discharging management and power consumption management by using the power management system.

Although not shown, the image capture device may further include a camera, a Bluetooth module, and the like. Details are not described herein.

In this embodiment of the present disclosure, the processor 1180 included in the image capture device further has a function of performing the steps of the method in any one of the foregoing implementations in FIG. 4 to FIG. 9.

The terminal device provided in this disclosure may be a mobile phone, a camera, a monitor, a tablet, or the like. The terminal device may further include one or more lenses. The terminal device is similar to the image capture device shown in FIG. 8. Details are not described herein again.

It may be clearly understood by the person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, a technical solution of this disclosure essentially, or the part contributing to the prior art, or all or some of the technical solution may be implemented in the form of a software product. The computer software product is stored in a storage medium and includes several instructions for instructing a computer device (which may be a personal computer, a server, or a network device) to perform all or some of the steps of the methods described in FIG. 4 to FIG. 9 in the embodiments of this disclosure. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions set forth in the foregoing embodiments or make equivalent replacements to some technical features thereof, without making the essence of the corresponding technical solutions depart from the scope of the technical solutions of the embodiments of this disclosure.

What is claimed is:

1. A depth image obtaining method, wherein the method is applied to a camera and the camera comprises a visible light sensor, a phase sensor, and a processor; and the method comprises:
    collecting, by the visible light sensor, a visible light image by imaging visible light of a shooting scene, and collecting, by the phase sensor, a phase image by imaging only infrared light of the shooting scene, wherein pixels in the phase image are in a one-to-one correspondence with pixels in the visible light image;
    obtaining, by the processor, depth information based on the phase image, wherein the depth information comprises a depth value of each pixel in the phase image; and
    obtaining, by the processor, an image by appending the depth value of each pixel in the phase image to data of a corresponding pixel in the visible light image,
    wherein the obtaining, by the processor, the depth information based on the phase image comprises:
    segmenting, by the processor, the phase image into N direction sub-images, wherein the N direction sub-images are images comprising pixel values in N dimensions in the phase image, N≥2, and N is an integer;
    segmenting, by the processor, each of the N direction sub-images into m pixel regions, wherein m≥1 and m is an integer;
    calculating, by the processor, a coordinate difference between a first pixel region in a first direction sub-image and a second pixel region in a second direction sub-image, wherein the first direction sub-image and the second direction sub-image are different direction sub-images in the N direction sub-images; the first pixel region is any one of m pixel regions in the first direction sub-image; and the second pixel region is a pixel region, corresponding to the first pixel region, in m pixel regions in the second direction sub-image; and
    calculating, by the processor, the depth information based on the coordinate difference.

2. The method according to claim 1, wherein the camera further comprises an infrared illuminator and the method further comprises:
    responsive to determining that a gain of the visible light sensor is not greater than a first threshold, and a gain of the phase sensor is not greater than a second threshold, controlling, by the processor, the infrared illuminator to be in an off state.

3. The method according to claim 1, wherein the camera further comprises an infrared illuminator; and before the collecting, by the visible light sensor, the visible light image of the shooting scene, and collecting, by the phase sensor, the phase image of the shooting scene, the method further comprises:

responsive to determining that a gain of the visible light sensor is greater than a first threshold, or a gain of the phase sensor is greater than a second threshold, controlling, by the processor, the infrared illuminator to be in an on state.

4. The method according to claim 1, wherein the method further comprises:
    obtaining, by the processor, a first luminance histogram of the phase image and a second luminance histogram of the visible light image, wherein the first luminance histogram comprises luminance distribution information of the phase image, and the second luminance histogram comprises luminance distribution information of the visible light image; and
    adjusting, by the processor, a gain of the phase sensor based on the first luminance histogram, and adjusting a gain of the visible light sensor based on the second luminance histogram.

5. The method according to claim 1, wherein the method further comprises:
    responsive to determining that a luminance of the visible light image is not greater than a threshold, obtaining, by the processor, luminance information in the phase image; and
    fusing, by the processor, the luminance information in the phase image with the luminance of the visible light image to obtain a next-frame visible light image, wherein a luminance of the next-frame visible light image is greater than the luminance of the visible light image.

6. The method according to claim 1, wherein the camera further comprises an infrared light filter; and the method further comprises:
    obtaining, by the processor, an illumination intensity of a current scene; and
    responsive to determining that the illumination intensity is greater than a threshold, controlling, by the processor, the infrared light filter to filter infrared light in light entering a lens to obtain filtered light, wherein the filtered light is used to generate the phase image and the visible light image.

7. An image capture device, comprising a visible light sensor, a phase sensor, and a processor, wherein
    the visible light sensor is configured to collect a visible light image by imaging visible light of a shooting scene;
    the phase sensor is configured to collect a phase image by imaging only infrared light of the shooting scene, wherein pixels in the phase image are in a one-to-one correspondence with pixels in the visible light image;
    the processor is configured to obtain depth information based on the phase image, wherein the depth information comprises a depth value of each pixel in the phase image; and
    the processor is further configured to obtain an image by appending the depth value of each pixel in the phase image to data of a corresponding pixel in the visible light image,
    wherein the processor is specifically configured to:
    segment the phase image into N direction sub-images, wherein the N direction sub-images are images comprising pixel values in N dimensions in the phase image, N≥2, and N is an integer;
    segment each of the N direction sub-images into m pixel regions, wherein m≥1 and m is an integer;
    calculate a coordinate difference between a first pixel region in a first direction sub-image and a second pixel region in a second direction sub-image, wherein the first direction sub-image and the second direction sub-image are different direction sub-images in the N direction sub-images; the first pixel region is any one of m pixel regions in the first direction sub-image; and the second pixel region is a pixel region, corresponding to the first pixel region, in m pixel regions in the second direction sub-image; and calculate the depth information based on the coordinate difference.

8. The image capture device according to claim 7, wherein the image capture device further comprises an infrared illuminator;

the processor is further configured to: responsive to determining that a gain of the visible light sensor is not greater than a first threshold, and a gain of the phase sensor is not greater than a second threshold, control the infrared illuminator to be in an off state; and the processor is further configured to obtain the depth information with reference to the phase image and the visible light image.

9. The image capture device according to claim 7, wherein the processor is further configured to: responsive to determining that a gain of the visible light sensor is greater than a first threshold, or a gain of the phase sensor is greater than a second threshold, control the infrared illuminator to be in an on state.

10. The image capture device according to claim 7, wherein:

the processor is configured to obtain a first luminance histogram of the phase image and a second luminance histogram of the visible light image, wherein the first luminance histogram comprises luminance distribution information of the phase image, and the second luminance histogram comprises luminance distribution information of the visible light image; and the processor is further configured to adjust a gain of the phase sensor based on the first luminance histogram, and adjust a gain of the visible light sensor based on the second luminance histogram.

11. The image capture device according to claim 8, wherein:

the processor is configured to obtain a first luminance histogram of the phase image and a second luminance histogram of the visible light image, wherein the first luminance histogram comprises luminance distribution information of the phase image, and the second luminance histogram comprises luminance distribution information of the visible light image; and the processor is further configured to adjust a gain of the phase sensor based on the first luminance histogram, and adjust a gain of the visible light sensor based on the second luminance histogram.

12. The image capture device according to claim 7, wherein the processor is configured to obtain a first luminance histogram of the phase image and a second luminance histogram of the visible light image, wherein the first luminance histogram comprises luminance distribution information of the phase image, and the second luminance histogram comprises luminance distribution information of the visible light image; and the processor is further configured to adjust a gain of the phase sensor based on the first luminance histogram, and adjust a gain of the visible light sensor based on the second luminance histogram.

13. The image capture device according to claim 7, wherein:

the processor is further configured to: responsive to determining that a luminance of the visible light image is not greater than a threshold, obtain luminance information of the phase image; and the processor is further configured to fuse the luminance information of the phase image with the luminance of the visible light image to obtain a next-frame visible light image, wherein a luminance of the next-frame visible light image is greater than the luminance of the visible light image.

14. The image capture device according to claim wherein:

the processor is further configured to: responsive to determining that a luminance of the visible light image is not greater than a threshold, obtain luminance information of the phase image; and the processor is further configured to fuse the luminance information of the phase image with the luminance of the visible light image to obtain a next-frame visible light image, wherein a luminance of the next-frame visible light image is greater than the luminance of the visible light image.

15. The image capture device according to claim 7, wherein:

the image capture device further comprises an infrared light filter;

the processor is further configured to: before the phase image and the visible light image are obtained, obtain an illumination intensity of a current scene; and the infrared light filter is configured to: responsive to determining that the illumination intensity is greater than a threshold, filter infrared light in light entering a lens to obtain filtered light, wherein the filtered light is used to generate the phase image and the visible light image.

16. The image capture device according to claim 8, wherein:

the image capture device further comprises an infrared light filter;

the processor is further configured to: before the phase image and the visible light image are obtained, obtain an illumination intensity of a current scene; and the infrared light filter is configured to: responsive to determining that the illumination intensity is greater than a threshold, filter infrared light in light entering a lens to obtain filtered light, wherein the filtered light is used to generate the phase image and the visible light image.

* * * * *

UNITED STATES PATENT AND TRADEMARK OFFICE
CERTIFICATE OF CORRECTION

PATENT NO. : 11,425,355 B2
APPLICATION NO. : 17/217755
DATED : August 23, 2022
INVENTOR(S) : Zhu et al.

It is certified that error appears in the above-identified patent and that said Letters Patent is hereby corrected as shown below:

In the Claims

Claim 1: Column 29, Line 38: "sions in the phase image, $N \geq 2$ and N is an integer;"
Should read -- sions in the phase image, $N > 2$ and N is an integer; --.

Claim 1: Column 29, Line 40: "sub-images into m pixel regions, wherein $m \geq 1$ and m"
Should read -- sub-images into m pixel regions, wherein $m > 1$ and m --.

Claim 7: Column 30, Line 63: "image, $N \geq 2$ and N is an integer;"
Should read -- image, $N > 2$ and N is an integer; --.

Claim 7: Column 30, Line 65: "regions, wherein $m \geq 1$ and m is an integer;"
Should read -- regions, wherein $m > 1$ and m is an integer; --.

Signed and Sealed this
Third Day of January, 2023

Katherine Kelly Vidal
*Director of the United States Patent and Trademark Office*